(12) United States Patent
Jiang et al.

(10) Patent No.: US 11,995,909 B2
(45) Date of Patent: May 28, 2024

(54) MULTIPATH REFLECTION CORRECTION

(71) Applicant: TDK Corporation, Tokoyo (JP)

(72) Inventors: Xiaoyue Jiang, San Jose, CA (US); Peter George Hartwell, Menlo Park, CA (US); Mei-Lin Chan, Milpitas, CA (US); Mamdouh Yanni, Brentwood, CA (US)

(73) Assignee: TDK CORPORATION, Tokyo (JP)

( * ) Notice: Subject to any disclaimer, the term of this patent is extended or adjusted under 35 U.S.C. 154(b) by 53 days.

(21) Appl. No.: 17/378,575

(22) Filed: Jul. 16, 2021

(65) Prior Publication Data
US 2022/0019754 A1    Jan. 20, 2022

Related U.S. Application Data

(60) Provisional application No. 63/053,451, filed on Jul. 17, 2020.

(51) Int. Cl.
*G06V 40/13*    (2022.01)
*G06V 40/12*    (2022.01)
*G10K 11/28*    (2006.01)

(52) U.S. Cl.
CPC ...... *G06V 40/1306* (2022.01); *G06V 40/1388* (2022.01); *G10K 11/28* (2013.01)

(58) Field of Classification Search
None
See application file for complete search history.

(56) References Cited

U.S. PATENT DOCUMENTS

| 4,880,012 A | 11/1989 | Sato |
| 5,575,286 A | 11/1996 | Weng et al. |

(Continued)

FOREIGN PATENT DOCUMENTS

| CN | 1826631 A | 8/2006 |
| CN | 101192644 A | 6/2008 |

(Continued)

OTHER PUBLICATIONS

Dausch, et al., "Theory and Operation of 2-D Array Piezoelectric Micromachined Ultrasound Transducers", IEEE Transactions on Ultrasonics, and Frequency Control, vol. 55, No. 11;, Nov. 2008, 2484-2492.

(Continued)

*Primary Examiner* — Benjamin X Casarez

(57) ABSTRACT

In a method for multipath reflection correction of acoustic signals received at an ultrasonic sensor, characteristics of multipath reflection signals of the ultrasonic sensor are accessed, wherein the characteristics of the multipath reflection signals include a relationship of primary signal contributions to multipath reflection signal contributions for acoustic signals received at the ultrasonic sensor at a plurality of times of flight for a plurality of locations of the ultrasonic sensor. Acoustic signals are received at the ultrasonic sensor over a time of flight range while a target is interacting with the ultrasonic sensor, wherein the acoustic signals include a primary signal contribution and a multipath reflection signal contribution. The characteristics of the multipath reflection signals are compared to received acoustic signals. The primary signal contribution of the received acoustic signals is determined at a plurality of times of flight of the time of flight range based on the characteristics of the multipath reflection signals.

20 Claims, 13 Drawing Sheets

(56) References Cited

U.S. PATENT DOCUMENTS

| | | |
|---|---|---|
| 5,680,863 A | 10/1997 | Hossack et al. |
| 5,684,243 A | 11/1997 | Gururaja et al. |
| 5,808,967 A | 9/1998 | Yu et al. |
| 5,867,302 A | 2/1999 | Fleming |
| 5,911,692 A | 6/1999 | Hussain et al. |
| 6,071,239 A | 6/2000 | Cribbs et al. |
| 6,104,673 A | 8/2000 | Cole et al. |
| 6,289,112 B1 | 9/2001 | Jain et al. |
| 6,292,576 B1 | 9/2001 | Brownlee |
| 6,296,610 B1 | 10/2001 | Schneider et al. |
| 6,350,652 B1 | 2/2002 | Libera et al. |
| 6,428,477 B1 | 8/2002 | Mason |
| 6,483,932 B1 | 11/2002 | Martinez et al. |
| 6,500,120 B1 | 12/2002 | Anthony |
| 6,676,602 B1 | 1/2004 | Barnes et al. |
| 6,679,844 B2 | 1/2004 | Loftman et al. |
| 6,736,779 B1 | 5/2004 | Sano et al. |
| 7,067,962 B2 | 6/2006 | Scott |
| 7,109,642 B2 | 9/2006 | Scott |
| 7,243,547 B2 | 7/2007 | Cobianu et al. |
| 7,257,241 B2 | 8/2007 | Lo |
| 7,400,750 B2 | 7/2008 | Nam |
| 7,433,034 B1 | 10/2008 | Huang |
| 7,459,836 B2 | 12/2008 | Scott |
| 7,471,034 B2 | 12/2008 | Schlote-Holubek et al. |
| 7,489,066 B2 | 2/2009 | Scott et al. |
| 7,634,117 B2 | 12/2009 | Cho |
| 7,665,763 B2 | 2/2010 | Bjoerklund et al. |
| 7,739,912 B2 | 6/2010 | Schneider et al. |
| 7,914,454 B2 | 3/2011 | Weber et al. |
| 8,018,010 B2 | 9/2011 | Tigli et al. |
| 8,139,827 B2 | 3/2012 | Schneider et al. |
| 8,255,698 B2 | 8/2012 | Li et al. |
| 8,311,514 B2 | 11/2012 | Bandyopadhyay et al. |
| 8,335,356 B2 | 12/2012 | Schmitt |
| 8,433,110 B2 | 4/2013 | Kropp et al. |
| 8,508,103 B2 | 8/2013 | Schmitt et al. |
| 8,515,135 B2 | 8/2013 | Clarke et al. |
| 8,666,126 B2 | 3/2014 | Lee et al. |
| 8,703,040 B2 | 4/2014 | Liufu et al. |
| 8,723,399 B2 | 5/2014 | Sammoura et al. |
| 8,805,031 B2 | 8/2014 | Schmitt |
| 9,056,082 B2 | 6/2015 | Liautaud et al. |
| 9,070,861 B2 | 6/2015 | Bibl et al. |
| 9,224,030 B2 | 12/2015 | Du et al. |
| 9,245,165 B2 | 1/2016 | Slaby et al. |
| 9,424,456 B1 | 8/2016 | Kamath Koteshwara et al. |
| 9,572,549 B2 | 2/2017 | Belevich et al. |
| 9,582,102 B2 | 2/2017 | Setlak |
| 9,582,705 B2 | 2/2017 | Du et al. |
| 9,607,203 B1 | 3/2017 | Yazdandoost et al. |
| 9,607,206 B2 | 3/2017 | Schmitt et al. |
| 9,613,246 B1 | 4/2017 | Gozzini et al. |
| 9,618,405 B2 | 4/2017 | Liu et al. |
| 9,665,763 B2 | 5/2017 | Du et al. |
| 9,747,488 B2 | 8/2017 | Yazdandoost et al. |
| 9,785,819 B1 | 10/2017 | Oreifej |
| 9,815,087 B2 | 11/2017 | Ganti et al. |
| 9,817,108 B2 | 11/2017 | Kuo et al. |
| 9,818,020 B2 | 11/2017 | Schuckers et al. |
| 9,881,195 B2 | 1/2018 | Lee et al. |
| 9,881,198 B2 | 1/2018 | Lee et al. |
| 9,898,640 B2 | 2/2018 | Ghavanini |
| 9,904,836 B2 | 2/2018 | Yeke Yazdandoost et al. |
| 9,909,225 B2 | 3/2018 | Lee et al. |
| 9,922,235 B2 | 3/2018 | Cho et al. |
| 9,933,319 B2 | 4/2018 | Li et al. |
| 9,934,371 B2 | 4/2018 | Hong et al. |
| 9,939,972 B2 | 4/2018 | Shepelev et al. |
| 9,953,205 B1 | 4/2018 | Rasmussen et al. |
| 9,959,444 B2 | 5/2018 | Young et al. |
| 9,967,100 B2 | 5/2018 | Hong et al. |
| 9,983,656 B2 | 5/2018 | Merrell et al. |
| 9,984,271 B1 | 5/2018 | King et al. |
| 10,006,824 B2 | 6/2018 | Tsai et al. |
| 10,080,544 B2 | 9/2018 | Chiang et al. |
| 10,275,638 B1 | 4/2019 | Yousefpor et al. |
| 10,315,222 B2 | 6/2019 | Salvia et al. |
| 10,322,929 B2 | 6/2019 | Soundara Pandian et al. |
| 10,325,915 B2 | 6/2019 | Salvia et al. |
| 10,387,704 B2 | 8/2019 | Dagan et al. |
| 10,445,547 B2 | 10/2019 | Tsai |
| 10,461,124 B2 | 10/2019 | Berger et al. |
| 10,478,858 B2 | 11/2019 | Lasiter et al. |
| 10,488,274 B2 | 11/2019 | Li et al. |
| 10,497,747 B2 | 12/2019 | Tsai et al. |
| 10,515,255 B2 | 12/2019 | Strohmann et al. |
| 10,539,539 B2 | 1/2020 | Garlepp et al. |
| 10,562,070 B2 | 2/2020 | Garlepp et al. |
| 10,600,403 B2 | 3/2020 | Garlepp et al. |
| 10,643,052 B2 | 5/2020 | Garlepp et al. |
| 10,656,255 B2 | 5/2020 | Ng et al. |
| 10,670,716 B2 | 6/2020 | Apte et al. |
| 10,706,835 B2 | 7/2020 | Garlepp et al. |
| 10,726,231 B2 | 7/2020 | Tsai et al. |
| 10,755,067 B2 | 8/2020 | De Foras et al. |
| 11,107,858 B2 | 8/2021 | Berger et al. |
| 11,112,388 B2 | 9/2021 | Garlepp et al. |
| 11,301,552 B2 | 4/2022 | Gurin et al. |
| 2001/0016686 A1 | 8/2001 | Okada et al. |
| 2001/0051772 A1 | 12/2001 | Bae |
| 2002/0062086 A1 | 5/2002 | Miele et al. |
| 2002/0135273 A1 | 9/2002 | Mauchamp et al. |
| 2003/0013955 A1 | 1/2003 | Poland |
| 2004/0059220 A1 | 3/2004 | Mourad et al. |
| 2004/0085858 A1 | 5/2004 | Khuri-Yakub et al. |
| 2004/0122316 A1 | 6/2004 | Satoh et al. |
| 2004/0174773 A1 | 9/2004 | Thomenius et al. |
| 2005/0023937 A1 | 2/2005 | Sashida et al. |
| 2005/0057284 A1 | 3/2005 | Wodnicki |
| 2005/0094490 A1 | 5/2005 | Thomenius et al. |
| 2005/0100200 A1 | 5/2005 | Abiko et al. |
| 2005/0110071 A1 | 5/2005 | Ema et al. |
| 2005/0146240 A1 | 7/2005 | Smith et al. |
| 2005/0148132 A1 | 7/2005 | Wodnicki et al. |
| 2005/0162040 A1 | 7/2005 | Robert |
| 2005/0228277 A1 | 10/2005 | Barnes et al. |
| 2006/0052697 A1 | 3/2006 | Hossack et al. |
| 2006/0079773 A1 | 4/2006 | Mourad et al. |
| 2006/0079777 A1 | 4/2006 | Karasawa |
| 2006/0210130 A1 | 9/2006 | Germond-Rouet et al. |
| 2006/0230605 A1 | 10/2006 | Schlote-Holubek et al. |
| 2006/0280346 A1 | 12/2006 | Machida |
| 2007/0016026 A1 | 1/2007 | Thomenius et al. |
| 2007/0046396 A1 | 3/2007 | Huang |
| 2007/0047785 A1 | 3/2007 | Jang et al. |
| 2007/0073135 A1 | 3/2007 | Lee et al. |
| 2007/0164632 A1 | 7/2007 | Adachi et al. |
| 2007/0202252 A1 | 8/2007 | Sasaki |
| 2007/0215964 A1 | 9/2007 | Khuri-Yakub et al. |
| 2007/0223791 A1 | 9/2007 | Shinzaki |
| 2007/0230754 A1 | 10/2007 | Jain et al. |
| 2008/0125660 A1 | 5/2008 | Yao et al. |
| 2008/0146938 A1 | 6/2008 | Hazard et al. |
| 2008/0150032 A1 | 6/2008 | Tanaka |
| 2008/0194053 A1 | 8/2008 | Huang |
| 2008/0240523 A1 | 10/2008 | Benkley et al. |
| 2009/0005684 A1 | 1/2009 | Kristoffersen et al. |
| 2009/0163805 A1 | 6/2009 | Sunagawa et al. |
| 2009/0171213 A1 | 7/2009 | Savord |
| 2009/0182237 A1 | 7/2009 | Angelsen et al. |
| 2009/0232367 A1 | 9/2009 | Shinzaki |
| 2009/0274343 A1 | 11/2009 | Clarke |
| 2009/0303838 A1 | 12/2009 | Svet |
| 2010/0030076 A1 | 2/2010 | Vortman et al. |
| 2010/0046810 A1 | 2/2010 | Yamada |
| 2010/0063391 A1 | 3/2010 | Kanai et al. |
| 2010/0113952 A1 | 5/2010 | Raguin et al. |
| 2010/0168583 A1 | 7/2010 | Dausch et al. |
| 2010/0195851 A1 | 8/2010 | Buccafusca |
| 2010/0201222 A1 | 8/2010 | Adachi et al. |
| 2010/0202254 A1 | 8/2010 | Roest et al. |
| 2010/0208004 A1 | 8/2010 | Ottosson et al. |
| 2010/0239751 A1 | 9/2010 | Regniere |

(56) References Cited

U.S. PATENT DOCUMENTS

| | | |
|---|---|---|
| 2010/0251824 A1 | 10/2010 | Schneider et al. |
| 2010/0256498 A1 | 10/2010 | Tanaka |
| 2010/0278008 A1 | 11/2010 | Ammar |
| 2011/0285244 A1 | 11/2011 | Lewis et al. |
| 2011/0291207 A1 | 12/2011 | Martin et al. |
| 2011/0319767 A1 | 12/2011 | Tsuruno |
| 2012/0016604 A1 | 1/2012 | Irving et al. |
| 2012/0092026 A1 | 4/2012 | Liautaud et al. |
| 2012/0095335 A1 | 4/2012 | Sverdlik et al. |
| 2012/0095344 A1 | 4/2012 | Kristoffersen et al. |
| 2012/0095347 A1 | 4/2012 | Adam et al. |
| 2012/0147698 A1 | 6/2012 | Wong et al. |
| 2012/0179044 A1 | 7/2012 | Chiang et al. |
| 2012/0224041 A1 | 9/2012 | Monden |
| 2012/0232396 A1 | 9/2012 | Tanabe |
| 2012/0238876 A1 | 9/2012 | Tanabe et al. |
| 2012/0263355 A1 | 10/2012 | Monden |
| 2012/0279865 A1 | 11/2012 | Regniere et al. |
| 2012/0288641 A1 | 11/2012 | Diatezua et al. |
| 2012/0300988 A1 | 11/2012 | Ivanov et al. |
| 2013/0051179 A1 | 2/2013 | Hong |
| 2013/0064043 A1 | 3/2013 | Degertekin et al. |
| 2013/0127297 A1 | 5/2013 | Bautista et al. |
| 2013/0127592 A1 | 5/2013 | Fyke et al. |
| 2013/0133428 A1 | 5/2013 | Lee et al. |
| 2013/0201134 A1 | 8/2013 | Schneider et al. |
| 2013/0271628 A1 | 10/2013 | Ku et al. |
| 2013/0294201 A1 | 11/2013 | Hajati |
| 2013/0294202 A1 | 11/2013 | Hajati |
| 2014/0003679 A1 | 1/2014 | Han et al. |
| 2014/0060196 A1 | 3/2014 | Falter et al. |
| 2014/0117812 A1 | 5/2014 | Hajati |
| 2014/0176332 A1 | 6/2014 | Alameh et al. |
| 2014/0208853 A1 | 7/2014 | Onishi et al. |
| 2014/0219521 A1 | 8/2014 | Schmitt et al. |
| 2014/0232241 A1 | 8/2014 | Hajati |
| 2014/0265721 A1 | 9/2014 | Robinson et al. |
| 2014/0294262 A1 | 10/2014 | Schuckers et al. |
| 2014/0313007 A1 | 10/2014 | Harding |
| 2014/0355387 A1 | 12/2014 | Kitchens et al. |
| 2015/0036065 A1 | 2/2015 | Yousefpor et al. |
| 2015/0049590 A1 | 2/2015 | Rowe et al. |
| 2015/0087991 A1 | 3/2015 | Chen et al. |
| 2015/0097468 A1 | 4/2015 | Hajati et al. |
| 2015/0105663 A1 | 4/2015 | Kiyose et al. |
| 2015/0127965 A1 | 5/2015 | Hong et al. |
| 2015/0145374 A1 | 5/2015 | Xu et al. |
| 2015/0164473 A1 | 6/2015 | Kim et al. |
| 2015/0165479 A1 | 6/2015 | Lasiter et al. |
| 2015/0169136 A1 | 6/2015 | Ganti et al. |
| 2015/0189136 A1 | 7/2015 | Chung et al. |
| 2015/0198699 A1 | 7/2015 | Kuo et al. |
| 2015/0206738 A1 | 7/2015 | Rastegar |
| 2015/0213180 A1 | 7/2015 | Herberholz |
| 2015/0220767 A1 | 8/2015 | Yoon et al. |
| 2015/0241393 A1 | 8/2015 | Ganti et al. |
| 2015/0261261 A1 | 9/2015 | Bhagavatula et al. |
| 2015/0286312 A1 | 10/2015 | Kang et al. |
| 2015/0301653 A1 | 10/2015 | Urushi |
| 2015/0324569 A1 | 11/2015 | Hong et al. |
| 2015/0345987 A1 | 12/2015 | Hajati |
| 2015/0357375 A1 | 12/2015 | Tsai et al. |
| 2015/0358740 A1 | 12/2015 | Tsai et al. |
| 2015/0362589 A1 | 12/2015 | Tsai |
| 2015/0371398 A1 | 12/2015 | Qiao et al. |
| 2016/0026840 A1* | 1/2016 | Li .................. G06V 40/1306 348/77 |
| 2016/0041047 A1 | 2/2016 | Liu et al. |
| 2016/0051225 A1 | 2/2016 | Kim et al. |
| 2016/0063294 A1 | 3/2016 | Du et al. |
| 2016/0063300 A1 | 3/2016 | Du et al. |
| 2016/0070967 A1 | 3/2016 | Du et al. |
| 2016/0070968 A1 | 3/2016 | Gu et al. |
| 2016/0086010 A1 | 3/2016 | Merrell et al. |
| 2016/0091378 A1 | 3/2016 | Tsai et al. |
| 2016/0092715 A1 | 3/2016 | Yazdandoost et al. |
| 2016/0092716 A1 | 3/2016 | Yazdandoost et al. |
| 2016/0100822 A1 | 4/2016 | Kim et al. |
| 2016/0107194 A1 | 4/2016 | Panchawagh et al. |
| 2016/0117541 A1 | 4/2016 | Lu et al. |
| 2016/0180142 A1 | 6/2016 | Riddle et al. |
| 2016/0240768 A1 | 8/2016 | Fujii et al. |
| 2016/0296975 A1 | 10/2016 | Lukacs et al. |
| 2016/0299014 A1 | 10/2016 | Li et al. |
| 2016/0326477 A1 | 11/2016 | Fernandez-Alcon et al. |
| 2016/0345930 A1 | 12/2016 | Mizukami et al. |
| 2016/0350573 A1 | 12/2016 | Kitchens et al. |
| 2016/0358003 A1 | 12/2016 | Shen et al. |
| 2017/0004346 A1 | 1/2017 | Kim et al. |
| 2017/0004352 A1 | 1/2017 | Jonsson et al. |
| 2017/0030552 A1 | 1/2017 | Garlepp et al. |
| 2017/0032485 A1 | 2/2017 | Vemury |
| 2017/0059380 A1 | 3/2017 | Li et al. |
| 2017/0075700 A1 | 3/2017 | Abudi et al. |
| 2017/0076132 A1 | 3/2017 | Sezan et al. |
| 2017/0090024 A1* | 3/2017 | Kitchens, II ........... G06V 10/12 |
| 2017/0100091 A1 | 4/2017 | Eigil et al. |
| 2017/0110504 A1 | 4/2017 | Panchawagh et al. |
| 2017/0119343 A1 | 5/2017 | Pintoffl |
| 2017/0124374 A1 | 5/2017 | Rowe et al. |
| 2017/0168543 A1 | 6/2017 | Dai et al. |
| 2017/0185821 A1 | 6/2017 | Chen et al. |
| 2017/0194934 A1 | 7/2017 | Shelton et al. |
| 2017/0200054 A1 | 7/2017 | Du et al. |
| 2017/0219536 A1 | 8/2017 | Koch et al. |
| 2017/0231534 A1 | 8/2017 | Agassy et al. |
| 2017/0243049 A1 | 8/2017 | Dong |
| 2017/0255338 A1 | 9/2017 | Medina et al. |
| 2017/0293791 A1 | 10/2017 | Mainguet et al. |
| 2017/0316243 A1 | 11/2017 | Ghavanini |
| 2017/0316248 A1 | 11/2017 | He et al. |
| 2017/0322290 A1 | 11/2017 | Ng |
| 2017/0322291 A1 | 11/2017 | Salvia et al. |
| 2017/0322292 A1 | 11/2017 | Salvia et al. |
| 2017/0322305 A1 | 11/2017 | Apte et al. |
| 2017/0323133 A1 | 11/2017 | Tsai |
| 2017/0325081 A1 | 11/2017 | Chrisikos et al. |
| 2017/0326590 A1 | 11/2017 | Daneman |
| 2017/0326591 A1 | 11/2017 | Apte et al. |
| 2017/0326593 A1 | 11/2017 | Garlepp et al. |
| 2017/0326594 A1 | 11/2017 | Berger et al. |
| 2017/0328866 A1 | 11/2017 | Apte et al. |
| 2017/0328870 A1 | 11/2017 | Garlepp et al. |
| 2017/0330012 A1 | 11/2017 | Salvia et al. |
| 2017/0330553 A1 | 11/2017 | Garlepp et al. |
| 2017/0344782 A1 | 11/2017 | Andersson |
| 2017/0357839 A1 | 12/2017 | Yazdandoost et al. |
| 2018/0025202 A1 | 1/2018 | Ryshtun et al. |
| 2018/0032788 A1 | 2/2018 | Krenzer et al. |
| 2018/0069168 A1 | 3/2018 | Ikeuchi et al. |
| 2018/0101711 A1 | 4/2018 | D'Souza et al. |
| 2018/0107852 A1 | 4/2018 | Fenrich et al. |
| 2018/0107854 A1 | 4/2018 | Tsai et al. |
| 2018/0129849 A1 | 5/2018 | Strohmann et al. |
| 2018/0129857 A1 | 5/2018 | Bonev |
| 2018/0150679 A1 | 5/2018 | Kim et al. |
| 2018/0178251 A1 | 6/2018 | Foncellino et al. |
| 2018/0206820 A1 | 7/2018 | Anand et al. |
| 2018/0217008 A1 | 8/2018 | Li et al. |
| 2018/0225495 A1 | 8/2018 | Jonsson et al. |
| 2018/0229267 A1 | 8/2018 | Ono et al. |
| 2018/0268232 A1 | 9/2018 | Kim et al. |
| 2018/0276443 A1 | 9/2018 | Strohmann et al. |
| 2018/0276672 A1 | 9/2018 | Breed et al. |
| 2018/0329560 A1 | 11/2018 | Kim et al. |
| 2018/0341799 A1 | 11/2018 | Schwartz et al. |
| 2018/0349663 A1 | 12/2018 | Garlepp et al. |
| 2018/0357457 A1 | 12/2018 | Rasmussen et al. |
| 2018/0369866 A1 | 12/2018 | Sammoura et al. |
| 2018/0373913 A1 | 12/2018 | Panchawagh et al. |
| 2019/0005300 A1 | 1/2019 | Garlepp et al. |
| 2019/0012673 A1 | 1/2019 | Chakraborty et al. |
| 2019/0018123 A1 | 1/2019 | Narasimha-Iyer et al. |
| 2019/0043920 A1 | 2/2019 | Berger et al. |

(56) References Cited

U.S. PATENT DOCUMENTS

| | | | |
|---|---|---|---|
| 2019/0046263 A1 | 2/2019 | Hayashida et al. | |
| 2019/0057267 A1 | 2/2019 | Kitchens et al. | |
| 2019/0073507 A1 | 3/2019 | D'Souza et al. | |
| 2019/0087632 A1 | 3/2019 | Raguin et al. | |
| 2019/0095015 A1 | 3/2019 | Han et al. | |
| 2019/0102046 A1 | 4/2019 | Miranto et al. | |
| 2019/0130083 A1 | 5/2019 | Agassy et al. | |
| 2019/0148619 A1 | 5/2019 | Ikeuchi et al. | |
| 2019/0171858 A1 | 6/2019 | Ataya et al. | |
| 2019/0175035 A1 | 6/2019 | Van Der Horst et al. | |
| 2019/0180069 A1* | 6/2019 | Akhbari | G06V 40/1306 |
| 2019/0188441 A1 | 6/2019 | Hall et al. | |
| 2019/0188442 A1 | 6/2019 | Flament et al. | |
| 2019/0247887 A1 | 8/2019 | Salvia et al. | |
| 2019/0311177 A1 | 10/2019 | Joo et al. | |
| 2019/0325185 A1 | 10/2019 | Tang | |
| 2019/0340455 A1 | 11/2019 | Jung et al. | |
| 2019/0354238 A1* | 11/2019 | Akhbari | G06F 3/0436 |
| 2019/0370518 A1 | 12/2019 | Maor et al. | |
| 2020/0030850 A1 | 1/2020 | Apte et al. | |
| 2020/0050816 A1 | 2/2020 | Tsai | |
| 2020/0050817 A1 | 2/2020 | Salvia et al. | |
| 2020/0050820 A1 | 2/2020 | Iatsun et al. | |
| 2020/0050828 A1 | 2/2020 | Li et al. | |
| 2020/0074135 A1 | 3/2020 | Garlepp et al. | |
| 2020/0111834 A1 | 4/2020 | Tsai et al. | |
| 2020/0125710 A1 | 4/2020 | Andersson et al. | |
| 2020/0147644 A1 | 5/2020 | Chang | |
| 2020/0158694 A1 | 5/2020 | Garlepp et al. | |
| 2020/0175143 A1 | 6/2020 | Lee et al. | |
| 2020/0194495 A1 | 6/2020 | Berger et al. | |
| 2020/0210666 A1 | 7/2020 | Flament | |
| 2020/0250393 A1 | 8/2020 | Tsai et al. | |
| 2020/0257875 A1* | 8/2020 | Hall | G06V 10/993 |
| 2020/0285882 A1 | 9/2020 | Skovgaard Christensen et al. | |
| 2020/0302140 A1 | 9/2020 | Lu et al. | |
| 2020/0342203 A1 | 10/2020 | Lin et al. | |
| 2020/0355824 A1 | 11/2020 | Apte et al. | |
| 2020/0400800 A1 | 12/2020 | Ng et al. | |
| 2020/0410070 A1 | 12/2020 | Strohmann | |
| 2020/0410193 A1 | 12/2020 | Wu | |
| 2021/0015456 A1 | 1/2021 | Chiang et al. | |
| 2021/0161503 A1 | 6/2021 | Mashood et al. | |
| 2022/0043144 A1* | 2/2022 | Yanni | G01S 7/52028 |
| 2022/0262161 A1 | 8/2022 | Zhao et al. | |

FOREIGN PATENT DOCUMENTS

| | | |
|---|---|---|
| CN | 102159334 A | 8/2011 |
| CN | 104415902 A | 3/2015 |
| CN | 105264542 A | 1/2016 |
| CN | 105378756 A | 3/2016 |
| CN | 106458575 B | 7/2018 |
| CN | 109196671 A | 1/2019 |
| CN | 109255323 A | 1/2019 |
| CN | 112241657 A | 1/2021 |
| EP | 1214909 A1 | 6/2002 |
| EP | 1768101 A1 | 3/2007 |
| EP | 2884301 A1 | 6/2015 |
| EP | 3086261 A2 | 10/2016 |
| EP | 1534140 B1 | 1/2019 |
| EP | 3292508 B1 | 12/2020 |
| EP | 3757884 A1 | 12/2020 |
| JP | 2011040467 A | 2/2011 |
| JP | 2014183229 A | 9/2014 |
| KR | 20200090355 A | 7/2020 |
| TW | 201531701 A | 8/2015 |
| WO | 2007018635 A1 | 2/2007 |
| WO | 2009096576 A2 | 8/2009 |
| WO | 2009137106 A2 | 11/2009 |
| WO | 2014035564 A1 | 3/2014 |
| WO | 2015009635 A1 | 1/2015 |
| WO | 2015112453 A1 | 7/2015 |
| WO | 2015120132 A1 | 8/2015 |
| WO | 2015131083 A1 | 9/2015 |
| WO | 2015134816 A1 | 9/2015 |
| WO | 2015183945 A1 | 12/2015 |
| WO | 2015193917 A2 | 12/2015 |
| WO | 2016007250 A1 | 1/2016 |
| WO | 2016011172 A1 | 1/2016 |
| WO | 2016022439 A1 | 2/2016 |
| WO | 2016040333 A2 | 3/2016 |
| WO | 2016053587 A1 | 4/2016 |
| WO | 2016061406 A1 | 4/2016 |
| WO | 2016061410 A1 | 4/2016 |
| WO | 2017003848 A1 | 1/2017 |
| WO | 2017053877 A2 | 3/2017 |
| WO | 2017192890 A1 | 11/2017 |
| WO | 2017192895 A1 | 11/2017 |
| WO | 2017192899 A1 | 11/2017 |
| WO | 2017196678 A1 | 11/2017 |
| WO | 2017196681 A1 | 11/2017 |
| WO | 2017196682 A1 | 11/2017 |
| WO | 2017192903 A3 | 12/2017 |
| WO | 2018148332 A1 | 8/2018 |
| WO | 2019005487 A1 | 1/2019 |
| WO | 2019164721 A1 | 8/2019 |
| WO | 2020081182 A1 | 4/2020 |

OTHER PUBLICATIONS

Hopcroft, et al., "Temperature Compensation of a MEMS Resonator Using Quality Factor as a Thermometer", Retrieved from Internet: http://micromachine.stanford.edu/~amanu/linked/MAH_MEMS2006.pdf, 2006, 222-225.

Hopcroft, et al., "Using the temperature dependence of resonator quality factor as a thermometer", Applied Physics Letters 91. Retrieved from Internet: http://micromachine.stanford.edu/~hopcroft/Publications/Hopcroft_QT_ApplPhysLett_91_013505.pdf, 2007, 013505-1-031505-3.

Lee, et al., "Low jitter and temperature stable MEMS oscillators", Frequency Control Symposium (FCS), 2012 IEEE International, May 2012, 1-5.

Li, et al., "Capacitive micromachined ultrasonic transducer for ultra-low pressure measurement: Theoretical study", AIP Advances 5.12. Retrieved from Internet: http://scitation.aip.org/content/aip/journal/adva/5/12/10.1063/1.4939217, 2015, 127231.

Qiu, et al., "Piezoelectric Micromachined Ultrasound Transducer (PMUT) Arrays for Integrated Sensing, Actuation and Imaging", Sensors 15, doi:10.3390/s150408020, Apr. 3, 2015, 8020-8041.

Savoia, et al., "Design and Fabrication of a cMUT Probe for Ultrasound Imaging of Fingerprints", 2010 IEEE International Ultrasonics Symposium Proceedings, Oct. 2010, 1877-1880.

Shen, et al., "Anisotropic Complementary Acoustic Metamaterial for Canceling out Aberrating Layers", American Physical Society, Physical Review X 4.4: 041033., Nov. 19, 2014, 041033-1-041033-7.

Tang, et al., "Pulse-Echo Ultrasonic Fingerprint Sensor on a Chip", IEEE Transducers, Anchorage, Alaska, USA, Jun. 21-25, 2015, pp. 674-677.

ISA/EP, Partial International Search Report for International Application No. PCT/US2019/034032, 8 pages, dated Sep. 12, 2019, 8.

ISA/EP, International Search Report and Written Opinion for International Application # PCT/US2018/063431, pp. 1-15, dated Feb. 5, 2019.

ISA/EP, International Search Report and Written Opinion for International Application # PCT/US2019/015020, pp. 1-23, dated Jul. 1, 2019.

ISA/EP, International Search Report and Written Opinion for International Application # PCT/US2019/023440, pp. 1-10, dated Jun. 4, 2019.

ISA/EP, International Search Report and Written Opinion for International Application No. PCT/US2017/031120, 12 pages, dated Aug. 29, 2017.

ISA/EP, International Search Report and Written Opinion for International Application No. PCT/US2017/031127, 13 pages, dated Sep. 1, 2017.

(56) References Cited

OTHER PUBLICATIONS

ISA/EP, International Search Report and Written Opinion for International Application No. PCT/US2017/031134, 12 pages, dated Aug. 30, 2017.
ISA/EP, International Search Report and Written Opinion for International Application No. PCT/US2017/031140, 18 pages, dated Nov. 2, 2017.
ISA/EP, International Search Report and Written Opinion for International Application No. PCT/US2017/031421 13 pages, dated Jun. 21, 2017.
ISA/EP, International Search Report and Written Opinion for International Application No. PCT/US2017/031426 13 pages, dated Jun. 22, 2017.
ISA/EP, International Search Report and Written Opinion for International Application No. PCT/US2017/031431, 14 pages, dated Aug. 1, 2017.
ISA/EP, International Search Report and Written Opinion for International Application No. PCT/US2017/031434, 13 pages, dated Jun. 26, 2017.
ISA/EP, International Search Report and Written Opinion for International Application No. PCT/US2017/031439, 10 pages, dated Jun. 20, 2017.
ISA/EP, International Search Report and Written Opinion for International Application No. PCT/US2017/031824, 18 pages, dated Sep. 22, 2017.
ISA/EP, International Search Report and Written Opinion for International Application No. PCT/US2017/031827, 16 pages, dated Aug. 1, 2017.
ISA/EP, International Search Report and Written Opinion for International Application No. PCT/US2017/031831, 12 pages, dated Jul. 21, 2017.
ISA/EP, International Search Report and Written Opinion for International Application No. PCT/US2018/037364, 10 pages, dated Sep. 3, 2018.
ISA/EP, International Search Report and Written Opinion for International Application No. PCT/US2020/033854, 16 pages, dated Nov. 3, 2020.
ISA/EP, International Search Report and Written Opinion for International Application No. PCT/US2020/039208, 10 pages, dated Oct. 9, 2020.
ISA/EP, International Search Report and Written Opinion for International Application No. PCT/US2020/039452, 11 pages, dated Sep. 9, 2020.
ISA/EP, International Search Report and Written Opinion for International Application No. PCT/US2020/042427, 18 pages, dated Dec. 14, 2020.
ISA/EP, International Search Report and Written Opinion for International Application No. PCT/US2020/042428, 9 pages, dated Oct. 26, 2020.
ISA/EP, International Search Report and Written Opinion for International Application No. PCT/US2021/021412, 12 pages, dated Jun. 9, 2021.
ISA/EP, International Search Report and Written Opinion for International Application No. PCT/US2021/021561, 9 pages, dated Jun. 28, 2021.
ISA/EP, International Search Report for International Application No. PCT/US2017/031826, 16 pages, dated Feb. 27, 2018.
ISA/EP, Partial International Search Report for International Application No. PCT/US2017/031140, 13 pages, dated Aug. 29, 2017.
ISA/EP, Partial International Search Report for International Application No. PCT/US2017/031823, 12 pages, dated Nov. 30, 2017.
ISA/EP, Partial Search Report and Provisional Opinion for International Application No. PCT/US2020/042427, 13 pages, dated Oct. 26, 2020.
ISA/EP, Partial Search Report for International Application No. PCT/US2020/033854, 10 pages, dated Sep. 8, 2020.
"Moving Average Filters", Waybackmachine XP05547422, Retrieved from the Internet: URL:https://web.archive.org/web/20170809081353/https//www.analog.com/media/en/technical-documentation/dsp-book/dsp_book_Ch15.pdf—[retrieved on Jan. 24, 2019], Aug. 9, 2017, 1-8.
Office Action for CN App No. 201780029016.7 dated Mar. 24, 2020, 7 pages.
Office Action for CN App No. 201780029016.7 dated Sep. 25, 2020, 7 pages.
Office Action for TW App No. 106113266 dated Jun. 22, 2020, 23 pages.
"Receiver Thermal Noise Threshold", Fisher Telecommunication Services, Satellite Communications. Retrieved from the Internet: URL:https://web.archive.org/web/20171027075705/http//www.fishercom.xyz:80/satellite-communications/receiver-thermal-noise-threshold.html, Oct. 27, 2017, 3.
"Sleep Mode", Wikipedia, Retrieved from the Internet: URL:https://web.archive.org/web/20170908153323/https://en.wikipedia.org/wiki/Sleep_mode [retrieved on Jan. 25, 2019], Sep. 8, 2017, 1-3.
"TMS320C5515 Fingerprint Development Kit (FDK) Hardware Guide", Texas Instruments, Literature No. SPRUFX3, XP055547651, Apr. 2010, 1-26.
"ZTE V7 Max. 5,5" smartphone on MediaTeck Helio P10 cpu; Published on Apr. 20, 2016; https://www.youtube.com/watch?v=ncNCbpkGQzU (Year: 2016)".
Cappelli, et al., "Fingerprint Image Reconstruction from Standard Templates", IEEE Transactions on Pattern Analysis and Machine Intelligence, IEEE Computer Society, vol. 29, No. 9, Sep. 2007, 1489-1503.
Feng, et al., "Fingerprint Reconstruction: From Minutiae to Phase", IEEE Transactions on Pattern Analysis and Machine Intelligence, IEEE Computer Society, vol. 33, No. 2, Feb. 2011, 209-223.
Jiang, et al., "Ultrasonic Fingerprint Sensor with Transmit Beamforming Based on a PMUT Array Bonded to CMOS Circuitry", IEEE Transactions on Ultrasonics Ferroelectrics and Frequency Control, Jan. 1, 2017, 1-9.
Kumar, et al., "Towards Contactless, Low-Cost and Accurate 3D Fingerprint Identification", IEEE Transactions on Pattern Analysis and Machine Intelligence, IEEE Computer Society, vol. 37, No. 3, Mar. 2015, 681-696.
Pang, et al., "Extracting Valley-Ridge Lines from Point-Cloud-Based 3D Fingerprint Models", IEEE Computer Graphics and Applications, IEEE Service Center, New York, vol. 33, No. 4, Jul./Aug. 2013, 73-81.
Papageorgiou, et al., "Self-Calibration of Ultrasonic Transducers in an Intelligent Data Acquisition System", International Scientific Journal of Computing, 2003, vol. 2, Issue 2 Retrieved Online: URL: https://scholar.google.com/scholar?q=self-calibration+of+ultrasonic+transducers+in+an+intelligent+data+acquisition+system&hl=en&as_sdt=0&as_vis=1&oi=scholart, 2003, 9-15.
Ross, et al., "From Template to Image: Reconstructing Fingerprints from Minutiae Points", IEEE Transactions on Pattern Analysis and Machine Intelligence, IEEE Computer Society, vol. 29, No. 4, Apr. 2007, 544-560.
Rozen, et al., "Air-Coupled Aluminum Nitride Piezoelectric Micromachined Ultrasonic Transducers at 0.3 MHz to 0.9 MHz", 2015 28th IEEE International Conference on Micro Electro Mechanical Systems (MEMS), IEEE, Jan. 18, 2015, 921-924.
Tang, et al., "11.2 3D Ultrasonic Fingerprint Sensor-on-a-Chip", 2016 IEEE International Solid-State Circuits Conference, IEEE, Jan. 31, 2016, 202-203.
Thakar, et al., "Multi-resonator approach to eliminating the temperature dependence of silicon-based timing references", Hilton Head'14. Retrieved from the Internet: http://blog.narotama.ac.id/wp-content/uploads/2014/12/Multi-resonator-approach-to-eliminating-the-temperature-dependance-of-silicon-based-timing-references.pdf, 2014, 415-418.
Zhou, et al., "Partial Fingerprint Reconstruction with Improved Smooth Extension", Network and System Security, Springer Berlin Heidelberg, Jun. 3, 2013, 756-762.
EP Office Action, for Application 17724184.1, dated Oct. 12, 2021, 6 pages.
EP Office Action, for Application 17725017.2 dated Feb. 25, 2022, 7 pages.
EP Office Action, dated Oct. 9, 2021, 6 pages.

(56) References Cited

OTHER PUBLICATIONS

European Patent Office, Office Action, App 17725018, pp. 5, dated Oct. 25, 2021.
European Patent Office, Office Action, App 17725020.6, pp. 4, dated Oct. 25, 2021.
ISA/EP, International Search Report and Written Opinion for International Application No. PCT/US2019061516, 14 pages, dated Mar. 12, 2020.
Office Action for CN App No. 201780028685.2 dated Dec. 5, 2022, 11 pages.
Office Action for CN App No. 201780027434.2 dated Oct. 21, 2022, 10 pages.
Office Action for CN App No. 201780027435.7 dated Sep. 9, 2022, 9 pages.
Office Action for CN App No. 201780027444.6 dated Dec. 2, 2022, 17 pages.
Office Action for CN App No. 201780029058.0 dated Dec. 2, 2022, 9 pages.
Office Action for CN App No. 201780029059.5 dated Nov. 11, 2022, 11 pages.
Office Action for CN App No. 2020800377355 dated Aug. 3, 2022, 8 pages.
Taiwan Application No. 106114623, 1st Office Action, dated Aug. 5, 2021, pp. 1-8.
Tang, et al., "Pulse-echo ultrasonic fingerprint sensor on a chip", 2015 Transducers, 2015 18th International Conference on Solid-State Sensors, Actuators and Microsystems, Apr. 1, 2015, 674-677.

\* cited by examiner

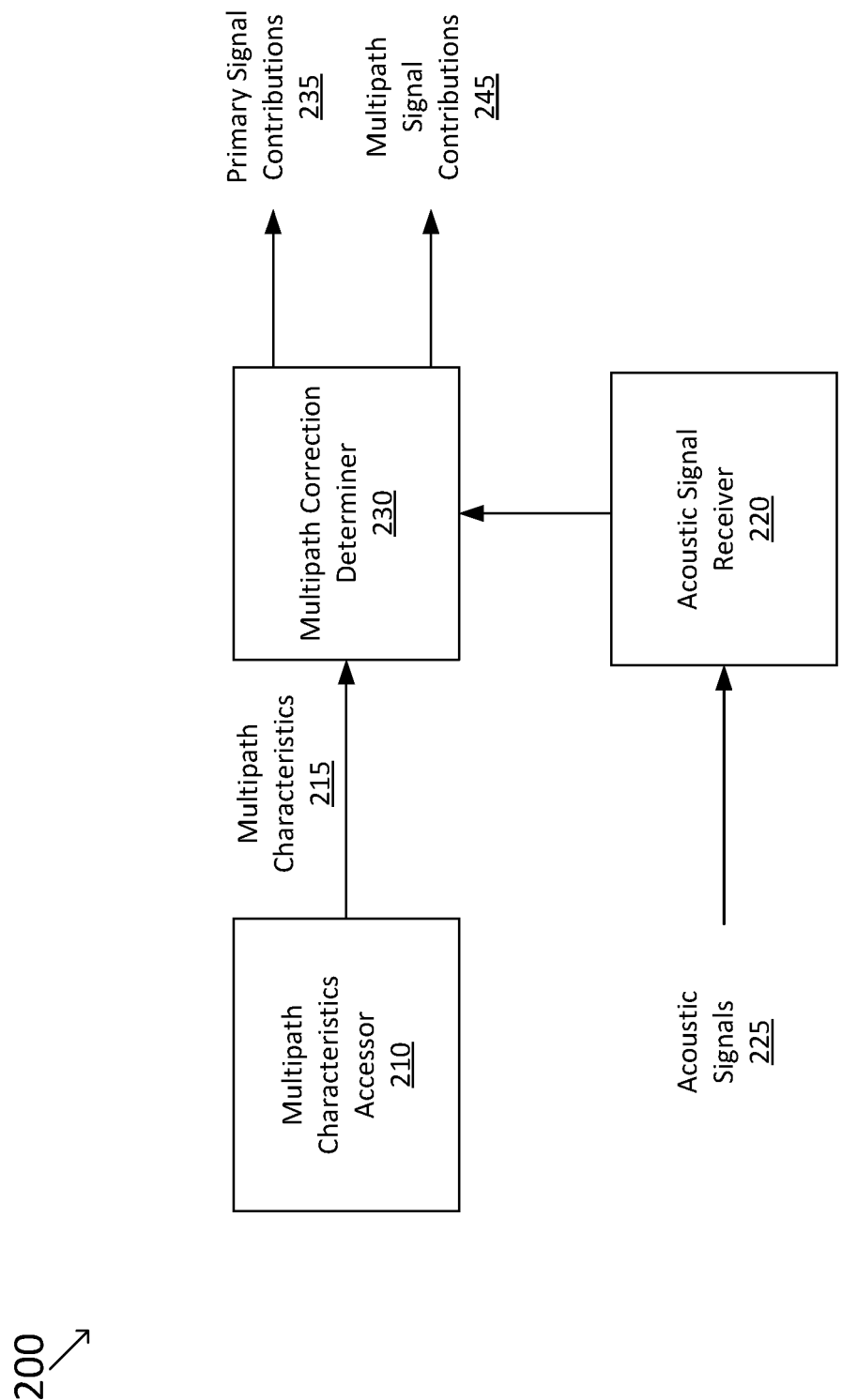

MULTIPATH REFLECTION CORRECTION

RELATED APPLICATIONS

This application claims priority to and the benefit of U.S. Patent Provisional Patent Application 63/053,451, filed on Jul. 17, 2020, entitled "ULTRASONIC FINGERPRINT SENSOR WITH FAKE FINGER DETECTION AND MULTIPATH CORRECTION," by Xiaoyue Jiang, and assigned to the assignee of the present application, which is incorporated herein by reference in its entirety.

BACKGROUND

Ultrasonic fingerprint sensors operate by transmitting ultrasonic signals onto a finger and imaging a fingerprint using the reflected ultrasonic signals. Transmitting ultrasonic signals also causes multipath signals other than the desired ultrasonic signals that reflect off the target finger. These multipath signals result in noise on the fingerprint image, and can be caused by a number of sources, e.g., reflections on the back of a substrate, reflections within the layers of the ultrasonic sensor stack, etc. In order to provide a high quality fingerprint image that is useful for user authentication, it is desired to reduce the impact of multipath reflections.

BRIEF DESCRIPTION OF THE DRAWINGS

The accompanying drawings, which are incorporated in and form a part of the Description of Embodiments, illustrate various non-limiting and non-exhaustive embodiments of the subject matter and, together with the Description of Embodiments, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

FIG. 2 illustrates a block diagram of an example multipath correction system for performing multipath reflection correction of acoustic signals received at an ultrasonic sensor, according to some embodiments.

DESCRIPTION OF EMBODIMENTS

Figure 1:
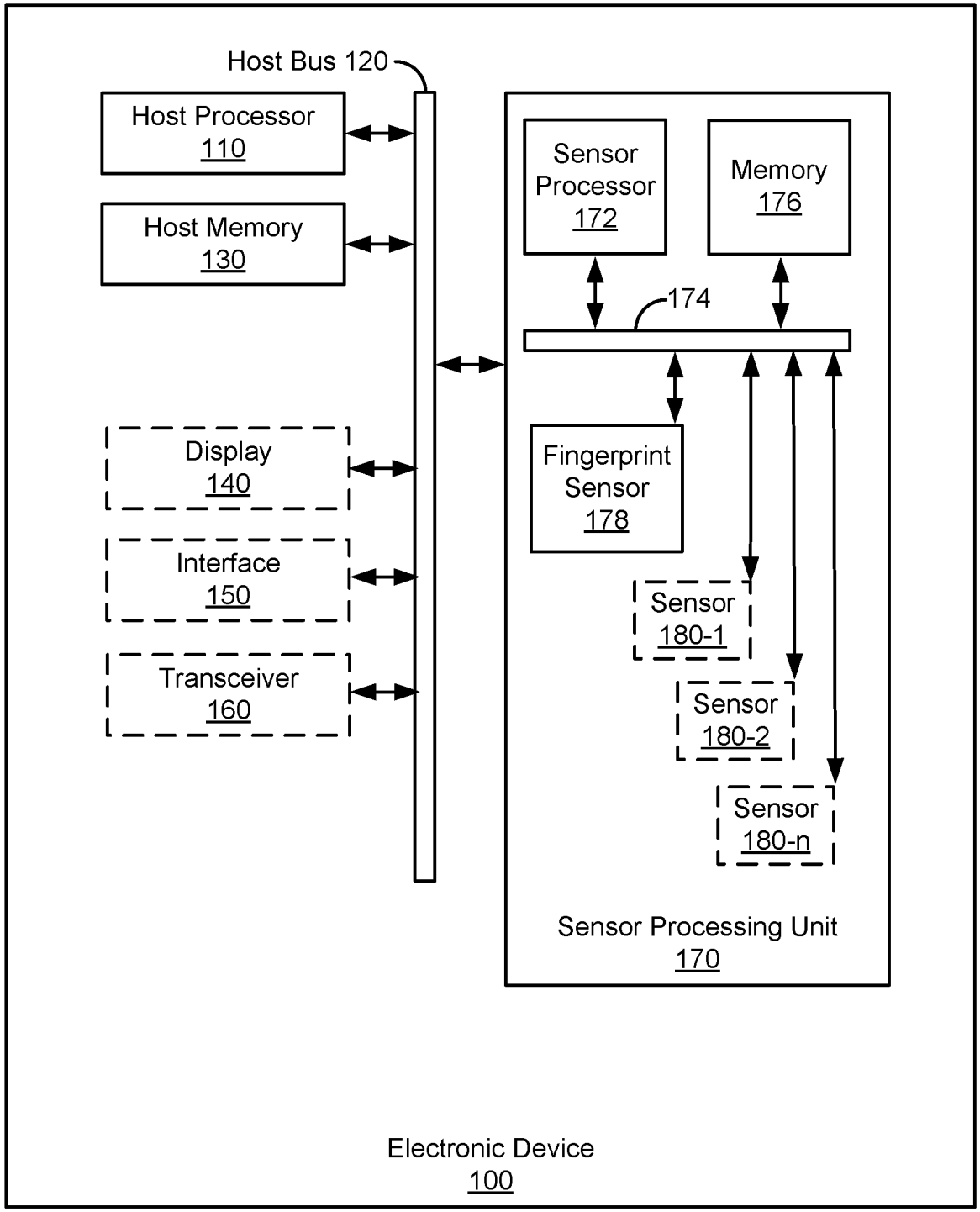
FIG. 1 is a block diagram of an example electronic device 100 upon which embodiments described herein may be implemented.

The following Description of Embodiments is merely provided by way of example and not of limitation. Furthermore, there is no intention to be bound by any expressed or implied theory presented in the preceding background or in the following Description of Embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of acoustic (e.g., ultrasonic) signals capable of being transmitted and received by an electronic device and/or electrical or magnetic signals capable of being stored, transferred, combined, compared, and otherwise manipulated in an electrical device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "accessing," "receiving," "determining," "comparing," "generating," "providing," "combining," "analyzing," "identifying," "displaying," "presenting,"

"using," "completing," "executing," or the like, refer to the actions and processes of an electronic device such as an electrical device.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example fingerprint sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of a device including a fingerprint sensor, upon which described embodiments can be implemented. An example system for multipath reflection correction of acoustic signals received at an ultrasonic sensor is then described, in accordance with various embodiments. Example operations of a system for multipath reflection correction of acoustic signals received at an ultrasonic sensor are then described.

Fingerprint sensors are used in electronic devices for user authentication, such as mobile electronic devices and applications operating on mobile electronic devices, locks for accessing cars or buildings, for protecting against unauthorized access to the devices and/or applications. Authentication of a fingerprint at a fingerprint sensor is performed before providing access to a device and/or application. In order to circumvent fingerprint authentication, attempts can be made to copy or spoof fingerprints of an authorized user using a fake or artificial finger. As such, fingerprint sensors should be capable of distinguishing real fingers from fake, artificial, or even dead fingers, also referred to herein as performing "spoof detection" or "fake finger detection". A "spoofed" fingerprint is a fake or artificial fingerprint that is used to attempt to circumvent security measures requiring fingerprint authentication. For example, an artificial finger may be used to gain unauthorized access to the electronic device or application, by making an unauthorized copy of the fingerprint of an authorized user, e.g., "spoofing" an actual fingerprint. The spoof detection may be performed by analyzing fingerprint images captured by the fingerprint sensor, e.g., performing biometric analysis of the fingerprint images, or looking at any characteristics that can help distinguish a fake/spoof fingerprint from a real fingerprint. These characteristics may be static features or dynamic features which have a certain time dependency because they change over time.

The fake finger investigation may include analyzing the ultrasound signal in one-dimension along one depth or penetration depth into the finger to a series of images in three-dimensions, (e.g., features along the X, Y, and Z axes). The features can also be static (e.g., additional feature into depth) or dynamic (e.g., a heartbeat extracted using Doppler signal processing). The ultrasonic fingerprint sensor may include a single or multiple ultrasonic transducers, where the transducers may be arranged in an array and may be using PMUT/MEMS technology. A single/multiple pixel transducer array may operate in A-mode ultrasonic imaging (e.g., single line transmit and receive). The received signal may be analyzed using any suitable techniques (e.g., via Doppler or Fourier transform) to extract key features to classify a real or fake finger.

In some embodiments, the presence of multipath reflection is taken into consideration. Multipath reflection occurs when signals reflect multiple times on different acoustic layers, e.g., within the sensor stack of the ultrasonic sensor. It should be appreciated that even for a phantom finger with no internal layers, multipath reflection can cause signals that could be interpreted as coming from deeper layers. The multipath signal is a result of the different acoustic path inside the sensor package. Although there are multipath signals shadowing the deeper finger layers, the acoustic reflection from multiple layers inside the finger can still be extracted by correcting for multipath signals reflections.

For example, for a phantom finger, the acoustic attenuation from a homogenous material may lead to a decrease in signal amplitude over time of flight because the energy of the signal is reduced during the multi reflections due to attenuation. However, due to the additional acoustic reflection from the additional layers inside a real finger, the signal amplitude over time of flight may increase, which can be used to classify a phantom or a finger. Thus, the amplitude of the reflections as a function of time of flight can be used for the fake finger investigation.

Embodiments described herein provide systems and methods for multipath correction using characteristics of the multipath reflection signals of the ultrasonic sensor. For example, during manufacture, testing, and/or calibration of the ultrasonic sensor, the characteristics of multipath reflection signals of the ultrasonic sensor can be determined, where the characteristics of the multipath reflection signals of the ultrasonic sensor include a relationship of primary signal contributions to multipath reflection signal contributions for acoustic signals received at the ultrasonic sensor at a plurality of times of flight for a plurality of locations of the ultrasonic sensor. In other words, the characteristics of multipath reflection signals of the ultrasonic sensor can depend on the sensor stack (e.g., acoustic impedance mismatch), the sensor arrangement, and/or the frequency of operation. Using these characteristics of multipath reflection signals for the ultrasonic sensor, the received acoustic signals can be analyzed, identifying the primary signal contributions and the multipath signal contributions, allowing for the identification of the primary signals of the received acoustic signals for multiple times of flight (e.g., for multiple tissue depths).

Embodiments described herein provide systems and methods for multipath reflection correction of acoustic signals received at an ultrasonic sensor. Characteristics of multipath reflection signals of the ultrasonic sensor are received, wherein the characteristics of the multipath reflection signals of the ultrasonic sensor comprise a relationship of primary signal contributions to multipath reflection signal contributions for acoustic signals received at the ultrasonic sensor at a plurality of times of flight for a plurality of locations of the ultrasonic sensor. Acoustic signals are received at the ultrasonic sensor over a time of flight range while a target is interacting with the ultrasonic sensor, wherein the acoustic signals comprise a primary signal contribution and a multipath reflection signal contribution. The characteristics of the multipath reflection signals of the ultrasonic sensor are compared to received acoustic signals. The primary signal contribution of the received acoustic signals is determined at a plurality of times of flight of the time of flight range based on the characteristics of the multipath reflection signals of the ultrasonic sensor determined during calibration.

In some embodiments, the characteristics of the multipath reflection signals of the ultrasonic sensor comprise a proportionality of the primary signal contribution and the multipath reflection signal contributions at a plurality of locations and different times of flight for the ultrasonic sensor. In some embodiments, accessing the characteristics of multipath reflection signals of the ultrasonic sensor includes receiving a signal strength template defining the proportionality of the primary signal contribution and the multipath reflection signal contributions at the plurality of locations and the different times of flight of the ultrasonic sensor during calibration, wherein the characteristics of multipath reflection signals of the ultrasonic sensor comprise the signal strength template. In some embodiments, accessing the characteristics of multipath reflection signals of the ultrasonic sensor further includes determining an image pattern template associated with a target interacting with the ultrasonic sensor from the received acoustic signals. The signal strength template and the image pattern template are combined to generate a target template, wherein the characteristics of multipath reflection signals of the ultrasonic sensor comprise the target template.

In some embodiments, an acoustic signal is identified as a first primary signal of the target. In some embodiments, comparing the characteristics of the multipath reflection signals of the ultrasonic sensor to the received acoustic signals includes comparing the characteristics of the multipath reflection signals of the ultrasonic sensor to the first primary signal. In some embodiments, a second primary signal is identified based on the comparing the characteristics of the multipath reflection signals of the ultrasonic sensor to the first primary signal, wherein the second primary signal has a later time of flight than the first primary signal. In some embodiments, the second primary signal is received from a deeper layer within the target than the first primary signal.

Example Mobile Electronic Device

Turning now to the figures, FIG. 1 is a block diagram of an example electronic device 100. As will be appreciated, electronic device 100 may be implemented as a device or apparatus, such as a handheld mobile electronic device. For example, such a mobile electronic device may be, without limitation, a mobile telephone phone (e.g., smartphone, cellular phone, a cordless phone running on a local network, or any other cordless telephone handset), a wired telephone (e.g., a phone attached by a wire), a personal digital assistant (PDA), a video game player, video game controller, a Head Mounted Display (HMD), a virtual or augmented reality device, a navigation device, an activity or fitness tracker device (e.g., bracelet, clip, band, or pendant), a smart watch or other wearable device, a mobile internet device (MID), a personal navigation device (PND), a digital still camera, a digital video camera, a portable music player, a portable video player, a portable multi-media player, a remote control, or a combination of one or more of these devices. In other embodiments, electronic device 100 may be implemented as a fixed electronic device, such as and without limitation, an electronic lock, a doorknob, a car start button, an automated teller machine (ATM), etc. In accordance with various embodiments, electronic device 100 is capable of reading fingerprints.

As depicted in FIG. 1, electronic device 100 may include a host processor 110, a host bus 120, a host memory 130, and a sensor processing unit 170. Some embodiments of electronic device 100 may further include one or more of a display device 140, an interface 150, a transceiver 160 (all depicted in dashed lines) and/or other components. In various embodiments, electrical power for electronic device 100 is provided by a mobile power source such as a battery (not shown), when not being actively charged.

Host processor 110 can be one or more microprocessors, central processing units (CPUs), DSPs, general purpose microprocessors, ASICs, ASIPs, FPGAs or other processors which run software programs or applications, which may be stored in host memory 130, associated with the functions and capabilities of electronic device 100.

Host bus 120 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. In the embodiment shown, host processor 110, host memory 130, display 140, interface 150, transceiver 160, sensor processing unit (SPU) 170, and other components of electronic device 100 may be coupled communicatively through host bus 120 in order to exchange commands and data. Depending on the architecture, different bus configurations may be employed as desired. For example, additional buses may be used to couple the various components of electronic device 100, such as by using a dedicated bus between host processor 110 and memory 130.

Host memory 130 can be any suitable type of memory, including but not limited to electronic memory (e.g., read only memory (ROM), random access memory, or other electronic memory), hard disk, optical disk, or some combination thereof. Multiple layers of software can be stored in host memory 130 for use with/operation upon host processor 110. For example, an operating system layer can be provided for electronic device 100 to control and manage system resources in real time, enable functions of application software and other layers, and interface application programs with other software and functions of electronic device 100. Similarly, a user experience system layer may operate upon or be facilitated by the operating system. The user experience system may comprise one or more software application programs such as menu navigation software, games, device function control, gesture recognition, image processing or adjusting, voice recognition, navigation software, communications software (such as telephony or wireless local area network (WLAN) software), and/or any of a wide variety of other software and functional interfaces for interaction with the user can be provided. In some embodiments, multiple different applications can be provided on a single electronic device 100, and in some of those embodiments, multiple applications can run simultaneously as part of the user experience system. In some embodiments, the user experience system, operating system, and/or the host processor 110 may operate in a low-power mode (e.g., a sleep mode) where very few instructions are processed. Such a low-power mode may utilize only a small fraction of the processing power of a full-power mode (e.g., an awake mode) of the host processor 110.

Display 140, when included, may be a liquid crystal device, (organic) light emitting diode device, or other display device suitable for creating and visibly depicting graphic images and/or alphanumeric characters recognizable to a user. Display 140 may be configured to output images viewable by the user and may additionally or alternatively function as a viewfinder for camera. It should be appreciated that display 140 is optional, as various electronic devices, such as electronic locks, doorknobs, car start buttons, etc., may not require a display device.

Interface 150, when included, can be any of a variety of different devices providing input and/or output to a user, such as audio speakers, touch screen, real or virtual buttons, joystick, slider, knob, printer, scanner, computer network I/O device, other connected peripherals and the like.

Transceiver 160, when included, may be one or more of a wired or wireless transceiver which facilitates receipt of data at electronic device 100 from an external transmission source and transmission of data from electronic device 100 to an external recipient. By way of example, and not of limitation, in various embodiments, transceiver 160 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications for wireless personal area network communication), and a wired a serial transceiver (e.g., a universal serial bus for wired communication).

Electronic device 100 also includes a general purpose sensor assembly in the form of integrated Sensor Processing Unit (SPU) 170 which includes sensor processor 172, memory 176, a fingerprint sensor 178, and a bus 174 for facilitating communication between these and other components of SPU 170. In some embodiments, SPU 170 may include at least one additional sensor 180 (shown as sensor 180-1, 180-2, . . . 180-n) communicatively coupled to bus 174. In some embodiments, at least one additional sensor 180 is a force or pressure sensor (e.g., a touch sensor) configured to determine a force or pressure or a temperature sensor configured to determine a temperature at electronic device 100. The force or pressure sensor may be disposed within, under, or adjacent fingerprint sensor 178. In some embodiments, all of the components illustrated in SPU 170 may be embodied on a single integrated circuit. It should be appreciated that SPU 170 may be manufactured as a stand-alone unit (e.g., an integrated circuit), that may exist separately from a larger electronic device and is coupled to host bus 120 through an interface (not shown). It should be appreciated that, in accordance with some embodiments, that SPU 170 can operate independent of host processor 110 and host memory 130 using sensor processor 172 and memory 176.

Sensor processor 172 can be one or more microprocessors, CPUs, DSPs, general purpose microprocessors, ASICs, ASIPs, FPGAs or other processors which run software programs, which may be stored in memory 176, associated with the functions of SPU 170. It should also be appreciated that fingerprint sensor 178 and additional sensor 180, when included, may also utilize processing and memory provided by other components of electronic device 100, e.g., host processor 110 and host memory 130.

Bus 174 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. In the embodiment shown, sensor processor 172, memory 176, fingerprint sensor 178, and other components of SPU 170 may be communicatively coupled through bus 174 in order to exchange data.

Memory 176 can be any suitable type of memory, including but not limited to electronic memory (e.g., read only memory (ROM), random access memory, or other electronic memory). Memory 176 may store algorithms or routines or other instructions for processing data received from fingerprint sensor 178 and/or one or more sensor 180, as well as the received data either in its raw form or after some processing. Such algorithms and routines may be implemented by sensor processor 172 and/or by logic or processing capabilities included in fingerprint sensor 178 and/or sensor 180.

A sensor 180 may comprise, without limitation: a temperature sensor, a humidity sensor, an atmospheric pressure sensor, an infrared sensor, a radio frequency sensor, a navigation satellite system sensor (such as a global positioning system receiver), an acoustic sensor (e.g., a microphone), an inertial or motion sensor (e.g., a gyroscope, accelerometer, or magnetometer) for measuring the orientation or motion of the sensor in space, or other type of sensor for measuring other physical or environmental factors. In one example, sensor 180-1 may comprise an acoustic sensor, sensor 180-2 may comprise a temperature sensor, and sensor 180-n may comprise a motion sensor.

In some embodiments, fingerprint sensor 178 and/or one or more sensors 180 may be implemented using a microelectromechanical system (MEMS) that is integrated with sensor processor 172 and one or more other components of SPU 170 in a single chip or package. It should be appreciated that fingerprint sensor 178 may be disposed behind display 140. Although depicted as being included within SPU 170, one, some, or all of fingerprint sensor 178 and/or one or more sensors 180 may be disposed externally to SPU 170 in various embodiments. It should be appreciated that fingerprint sensor 178 can be any type of fingerprint sensor, including without limitation, an ultrasonic sensor, an optical sensor, a camera, etc.

Example Multipath Correction System for Performing Multipath Reflection Correction of Acoustic Signals Received at an Ultrasonic Sensor FIG. 2 illustrates a block diagram of an example multipath correction system 200 for performing multipath reflection correction of acoustic signals received at an ultrasonic sensor, according to some embodiments. Multipath correction system 200 is configured to correct for multipath signal contributions to acoustic signals received at an ultrasonic sensor, according to various embodiments. It should be appreciated that multipath correction system 200 can be implemented as hardware, software, or any combination thereof. It should also be appreciated that multipath characteristics accessor 210, acoustic signal receiver 220, and multipath correction determiner 230 may be separate components, may be comprised within a single component, or may be comprised in various combinations of multiple components (e.g., multipath characteristics accessor 210 and multipath correction determiner 230 may be comprised within a single component), in accordance with some embodiments. Multipath characteristics accessor 210 is described in detail at FIG. 3A and multipath correction determiner 230 is described in detail at FIG. 3B, according to some embodiments.

Acoustic signal receiver 220 is configured to receive acoustic signals 225 from an ultrasonic sensor (e.g., during fingerprint image capture). The ultrasonic sensor (e.g., ultrasonic fingerprint sensor) is operable to emit and detect acoustic signals (also referred to as ultrasonic signals or ultrasound signals). An array of ultrasonic transducers (e.g., Piezoelectric Micromachined Ultrasonic Transducers (PMUTs)) may be used to transmit and receive the ultrasonic waves, where the ultrasonic transducers of the array are capable of performing both the transmission and receipt of the ultrasonic waves. The emitted ultrasonic waves are reflected from any objects in contact with (or in front of) the fingerprint sensor as well as reflections caused by acoustic impedance mismatches within the sensor stack (e.g., layer boundaries or other transitions), and these reflected ultrasonic waves, or echoes, are then detected. Where the object is a finger, the waves are reflected from different features of the finger, such as the surface features on the skin, fingerprint, or features present in deeper layers of the finger (e.g., the dermis). Examples of surface features of a finger are ridges and valleys of a fingerprint, e.g., the ridge/valley pattern of the finger. For example, the reflection of the sound waves from the ridge/valley pattern enables the fingerprint sensor to produce a fingerprint image that may be used for identification of the user.

In accordance with some embodiments, acoustic signals 225 are captured at an ultrasonic sensor at multiple different times of flight. It should be appreciated that operating parameters of an ultrasonic fingerprint sensor can be controlled, allowing for image capture at different times of flight. For instance, an adjustment of timing of transmission of the ultrasonic signals for ultrasonic transducers of an ultrasonic fingerprint sensor can change the time of flight. The sensor stack (e.g., transitions between layers of the stack) also can impact the time of flight.

Figure 4:
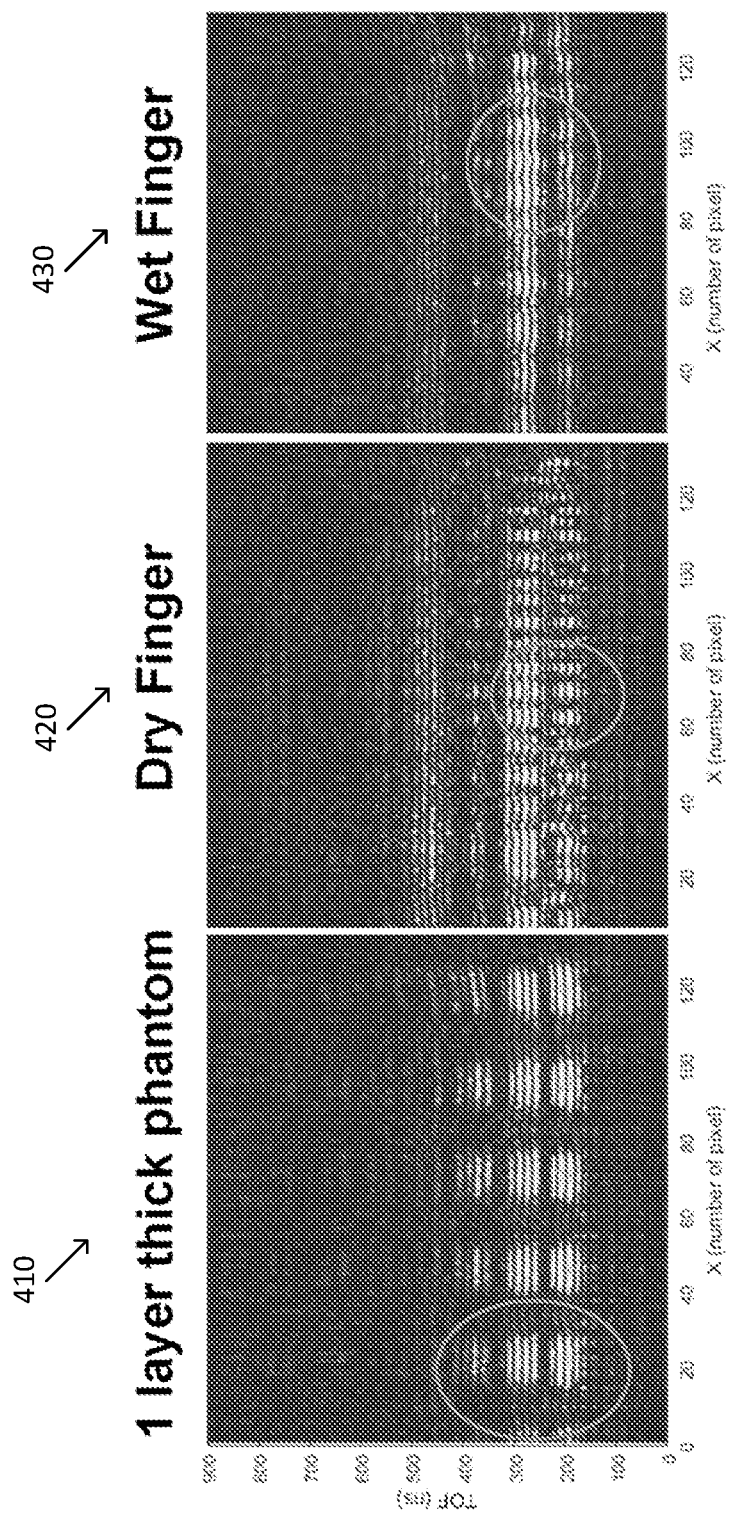
FIG. 4 shows examples of the measured signal amplitude's distribution over time of flight for different targets, according to embodiments.

FIG. 4 shows examples of the measured acoustic signal amplitude distribution over time of flight for different targets, according to embodiments, for illustrating how target conditions (e.g., finger conditions) impact the signal amplitude. In each plot, the x axis shows pixels of the ultrasonic sensor across rows or columns, the y axis is the time of flight, and the grayscale representation indicates the signal amplitude for the pixel at the time of flight (signal intensity increases from black to white). Plot 410 shows an example signal amplitude over time of flight for a phantom target with a line pattern, showing that signal intensity decreases over the time of flight. Plot 420 shows an example signal amplitude over time of flight for a dry finger, showing that signal intensity increases over the time of flight. Plot 430 shows an example signal amplitude over time of flight for a wet finger, showing that signal intensity increase over the time of flight. In some embodiments, classifiers based on the signal amplitude distribution over time of flight could be established to distinguish a real and fake finger.

It should be appreciated that the plots of acoustic signal amplitude of FIG. 4 include primary signals and multipath signals, where the primary signals are generated by receiving reflections off a target (e.g., a finger) and the multipath signals are signals generated by reflections within the sensor stack and off the substrate (e.g., anything other than the finger being imaged). The plots of FIG. 4 illustrate that the fastest signals with the shortest time of flight are at the bottom of the plots, while the multipath reflections take longer to return to the ultrasonic sensor, and thus have a longer time of flight. As illustrated, the first primary signal (e.g., outer layer of target) has a time of flight of approximately 200 ns, with primary signals associated with deeper layers of the target have longer times of flight, all of which are impacted by the multipath signals.

Figure 5:
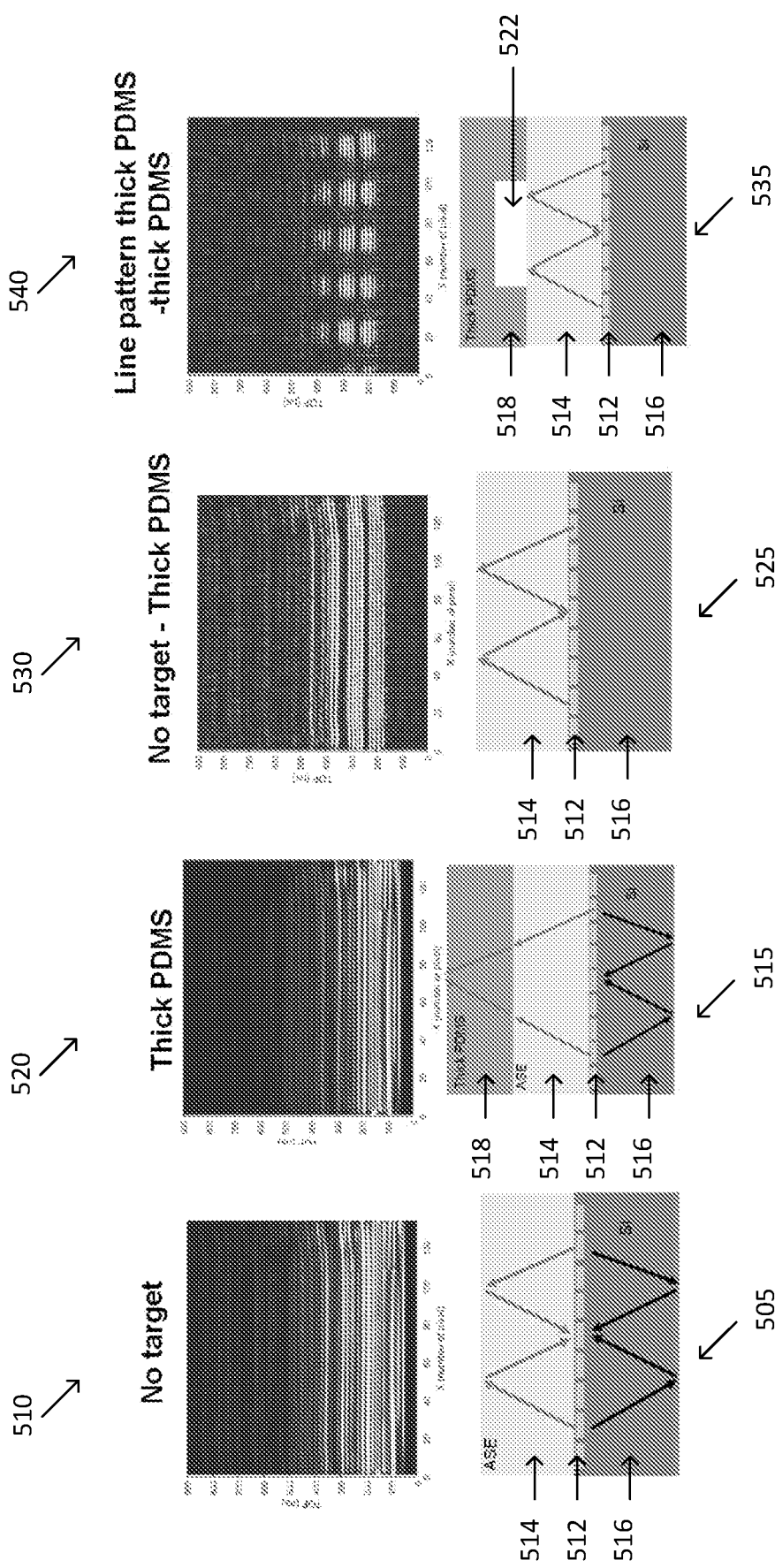
FIG. 5 shows examples of the measured signal amplitude's distribution over time of flight for different targets, according to embodiments.

An ultrasonic sensor may be comprised of several layers, e.g., the substrate layer, the ultrasonic transducer layer, an acoustic coupling layer, and a contact layer (e.g., glass, metal, polydimethylsiloxane (PDMS), etc.) It should be appreciated that the ultrasonic sensor can include many different layers, each of which can have a different acoustic impedance that impacts the transitions between the layers, resulting in acoustic impedance mismatches. FIG. 5 shows examples of the measured signal amplitude's distribution over time of flight for different targets, according to embodiments, for illustrating various multipath contributions to received acoustic signals. FIG. 5 shows an example with a silicon (Si) substrate (190 um), an ultrasonic array layer with a transducer pitch of about 70 um, and an acoustic coupling layer of 130 um (it should be appreciated that the layers of ultrasonic sensors 505, 515, 525, and 535 are not shown to scale). Multipath reflection can occur for signal that never interacted with the target (e.g., a finger) and can even be reflected backward into the substrate. The more layers there are in the sensor stack, the more these layers can contribute to multipath reflections. This also means that the information from a specific layer in the target may be present at multiple times in the reflected signal because the information can reach the transducers through different paths. Different signals from different layers may create shadowing or interference with each other. For example, the target information at one depth will present at multiple time of flight in the received signal. This leads to shadowing effect and prevents ultrasonic sensors from obtaining clean three-dimensional (3D) information. In order to obtain clean ultrasonic information from a 3D target, signal processing can account for the impact of these multipath signals and isolate the primary signals by identifying the multipath signal contributions to received acoustic signals.

There are two types of multipath signals, one including the target information and another including acoustic paths that have never passed the target/package interface (e.g., internal sensor stack reflections), mainly including acoustic energies trapped inside the multilayer package. In accordance with the described embodiments, the material properties and package thickness are fixed across measurements and can be characterized to use in determining the multipath contributions.

The described embodiments utilize a characterization of the multipath reflection signal contribution to the overall received acoustic signal, and then corrects the measured signal to correct for the multipath reflections. For example, first the multipath behavior over times of flight over the ultrasonic sensor is determined, and this multipath characteristic behavior for the ultrasonic sensor is then used to correct the different time of flight signals. The multipath reflections from the sensor stack itself are considered static and so the multipath characteristics can be determined by analyzing the signal when no target or a controlled/known target is present, as shown in FIG. 5. FIG. 5 shows the multipath signals for a transmit sequence of four different examples. The example sensor stacks 505 in FIG. 5 shows a linear array 512 of nine transducers, acoustic coupling layer 514 overlying linear array 512, and silicon substrate 516 underneath linear array 512, representing a cross section of a larger two-dimensional (2D) array of transducers.

Embodiments described herein provide a procedure to remove the acoustic reflection that does not contain the target information. As illustrated in plot 510 of FIG. 5, measured signals for an ultrasonic sensor 505 result from all the acoustic energy that passes through or never pass through the target/package interface. As shown, the reflection can come from the target (top) side or from the substrate (bottom) side of the sensor 505. The signal can also contain transducer cross talk contribution. The transducer array may transmit from transducers on the edge, and receive on the center transducer, for example to facilitate beam forming. Illustrated in example plot 520 of FIG. 5, if a target with similar acoustic impedance to the package is placed on top of the sensor 515, e.g., polydimethylsiloxane (PDMS) 518, there is no significant reflection from the target side, and the received signal only results from the energy that never passes through the target/package interface, because most of the energy through the target/package interface is transmitted through and absorbed by the target. In this case, the measured signal thus comes from reflections from the substrate side and the transducer crosstalk. Based on a combination of these calibration results, the signal contributions coming only from the target side can be determined. The difference of the signal between no target and PDMS, shown in example plot 530 of FIG. 5 (e.g., plot 510 minus plot 520), includes all the signal results from the energy that passes through the target/package interface of sensor 525. As shown in example plot 540 of FIG. 5, if a line shaped target 522 is placed on top of the sensor 535, the target will shape all the signals amplitude over time of flight in example plot 530. In areas of the target where the PDMS is in contact with the sensor 535, little signal remains because the acoustic energy is transmitted into the target and the multipath signals from the other reflections have been corrected. It should be appreciated that plot 540 is not aligned with sensor 535 as illustrated, as sensor 535 illustrates one cavity, while plot 540 illustrates five cavities.

With reference to FIG. 2, multipath characteristics accessor 210 is configured to access multipath characteristics for the ultrasonic sensor. In accordance with the described embodiments, each sensor has its own multipath characteristics that define the expected signal strength at different locations on the ultrasonic sensor at different times of flight. For example, the multipath characteristics for the ultrasonic sensor can be determined at the time of fabrication and/or calibration of the ultrasonic sensor (e.g., before shipping) and can be stored in memory associated with the ultrasonic sensor. For example, the characteristics of the multipath reflection signals of the ultrasonic sensor are determined without a target interacting with the ultrasonic sensor. These multipath characteristics include a relationship of primary signal contributions to multipath reflection signal contributions for acoustic signals received at the ultrasonic sensor at a plurality of times of flight for a plurality of locations of the ultrasonic sensor.

In accordance with some embodiments, multipath characteristics 215 includes the calibrated reflection with no target on top as the time of flight (TOF) template, also referred to herein as the Z template, for the signal amplitude and time of flight arrival for any target information that will come back from the package/target interface. In other embodiments, multipath characteristics 215 include the TOF template as modified by an image pattern template, also referred to herein as the XY template, based on the acoustic signals 225. It should be appreciated that the use of the image pattern template is optional.

Figure 6:
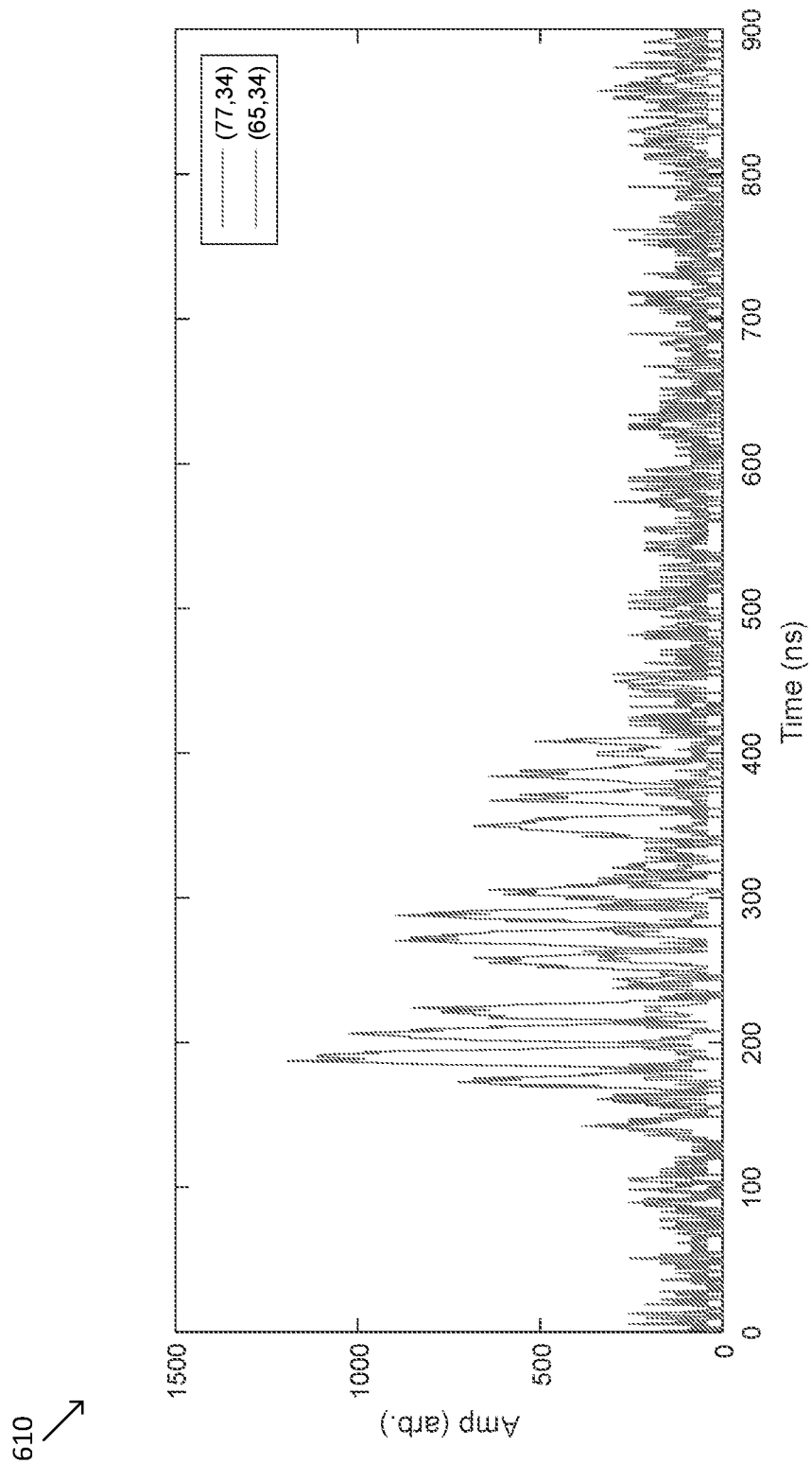
FIG. 6 shows an example plot of signal amplitude over time of flight for use in determining multipath characteristics for an ultrasonic sensor, according to embodiments.

FIG. 6 shows an example plot 610 of signal amplitude over time of flight for use in determining multipath characteristics for an ultrasonic sensor, according to embodiments. The calibration or multipath correction procedure described herein also deals with the multipath signal that carries the target information. The target used here in the example of FIG. 6 is a repetitive line target (e.g., as shown at X=22 of plot 410 of FIG. 4). As illustrated in plot 610, the multipath signal carrying target information includes that same target information arrives at several times of flight, which are determined by the package material properties and thicknesses. As shown in plot 610, the signal from the first reflection comes back at around 200 ns. The acoustic energy from the first reflection may be reflected back and forth inside the fingerprint sensor stack until it is fully attenuated. The time of flight of the later reflections is determined mostly by the layout of the sensor stack and material properties as most of the acoustic energy is traveling up and down in the package, while the time of flight of the first reflection is also determined by the transducer array size. As the transducer array size is comparable to the package thickness in this case, there are four pulses associated with the first reflection between approximately 160-220 ns, while the time of flight of the later reflections are approximately 80-100 ns later (e.g., the peaks associated with the second reflection occur at approximately 250 ns and 310 ns). The expected time of flight for those reflections based on material thickness and properties are between 80-100 ns. In the measurements, shown in plot 610, the times of flight between the reoccurring reflections after the first one is around 80 ns. As the later signal resulting from the acoustic energy carrying the target information is travelling within the ultrasonic sensor, the multipath characteristics do not change with certain material properties and sensor thickness. It should be appreciated that the multipath signal also carries the same target information and that the second and third peaks (comprising four pulses each) can hide a primary signal of deeper layers (which are weaker due to their depth).

Figure 3A:
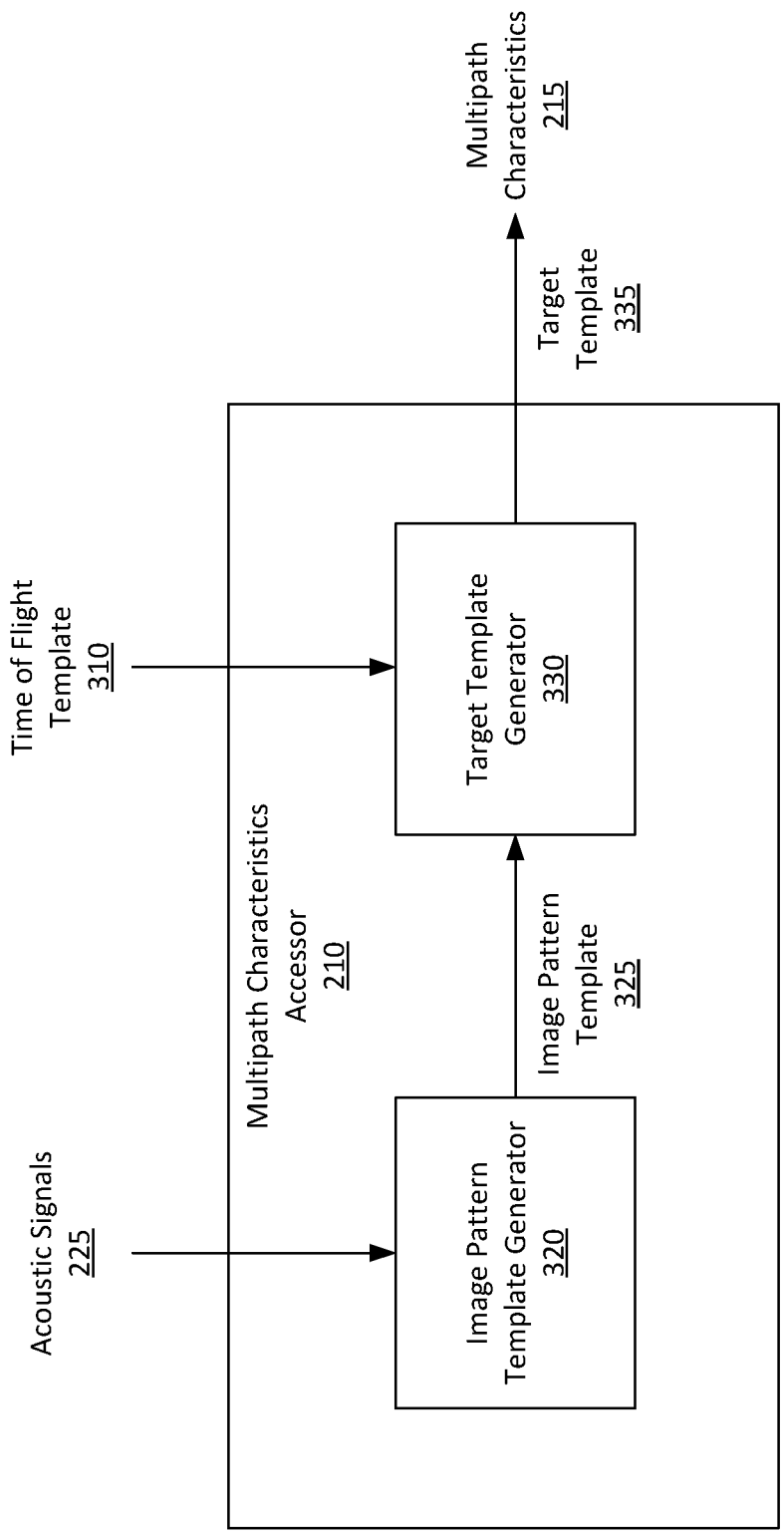
FIG. 3A illustrates a block diagram of an example multipath characteristics accessor of a multipath correction system, according to some embodiments.

FIG. 3A illustrates a block diagram of example multipath characteristics accessor 210 of multipath correction system 200, according to some embodiments. As illustrated in FIG. 3A, multipath characteristics 215 are generated using acoustic signals 225 and time of flight (TOF) template 310. However, it should be appreciated that the acoustic signals 225 contribution to multipath characteristics 215 is optional, and that multipath characteristics 215 can include only TOF template 310.

Figure 7:
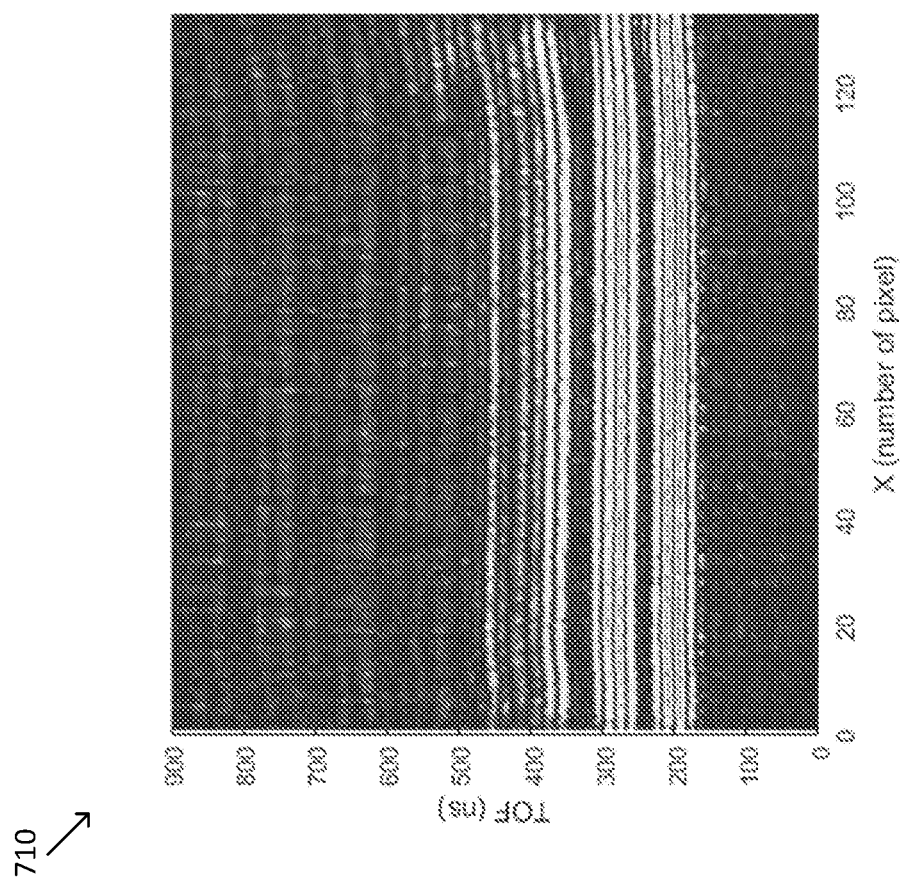
FIG. 7 illustrates an example time of flight (TOF) template for an ultrasonic sensor, according to embodiments.

TOF template 310 defines the relationship of primary signal contributions to multipath reflection signal contributions for acoustic signals received at the ultrasonic sensor at a plurality of times of flight for a plurality of locations of the ultrasonic sensor. FIG. 7 illustrates an example TOF template 710 for an ultrasonic sensor, according to embodiments. As illustrated, the x axis shows pixels of the ultrasonic sensor across rows or columns, the y axis is the time of flight, and the color indicates the signal amplitude for the pixel at the time of flight. The TOF template 710 includes the expected signal amplitude at different times of flight for the ultrasonic sensor when no target is interacting with the ultrasonic sensor.

As shown in FIG. 7, in one example, the described embodiments use the calibrated reflection with no target on top as the TOF template 710, also referred to herein as the Z template, for the signal amplitude and time of flight arrival for any target information that will come back from the package/target interface. This TOF template 710 includes the multipath information including amplitude and phase from the first and the later reoccurring reflections. The TOF template 710 can be a global template that is average over the sensor surface, or can be a local template to correct for local variation in the multipath signal.

With reference to FIG. 3A, multipath characteristics accessor 210 can also generate an image pattern template 325 for use in generating a three-dimensional template that is tuned for not only the ultrasonic sensor, but also the specific target being imaged. Multipath characteristics accessor 210 includes image pattern template generator 320 for receiving acoustic signals 225. It should be appreciated that acoustic signals 225 can be the same acoustic signals 225 received at acoustic signal receiver 220 of FIG. 2.

Figure 8:
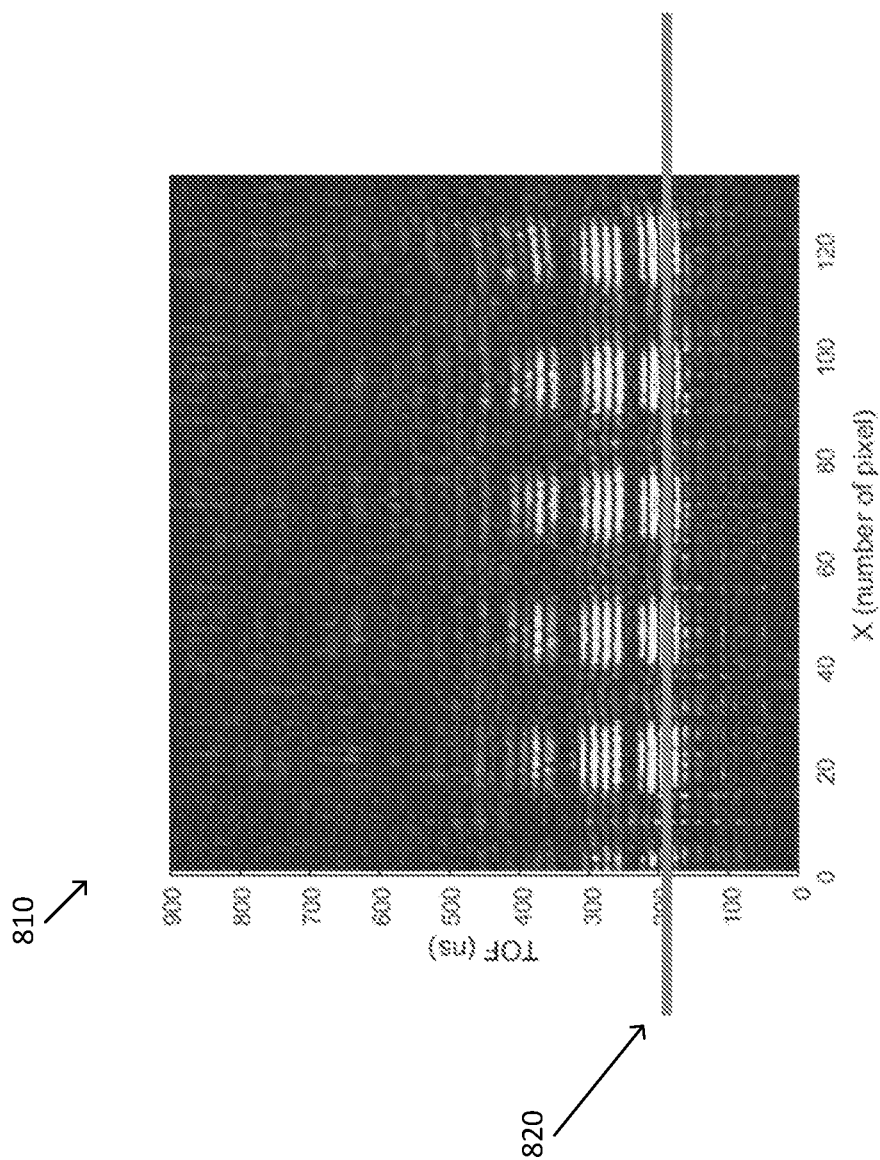
FIG. 8 illustrates an example image pattern template for a target interacting with an ultrasonic sensor, according to embodiments.

FIG. 8 illustrates an example image pattern template 810 for a target interacting with an ultrasonic sensor, according to embodiments. In some embodiments, based on the first time of flight of received acoustic signals, as indicated at line 820, the image pattern information received from the ultrasonic sensor is reconstructed and used as an image pattern template 810, also referred to herein as an XY template. The image pattern template 810 is used to indicate which pixels have a signal (e.g., are over a signal threshold) and which pixels do not have a signal (e.g., are under a signal threshold) for determining which pixels of the TOF template 710 can be disregarded for multipath signal determination. For example, the image pattern template 810 can be used to shape TOF template 710, resulting in a 3D template that captures all the multipath signals that is from the pattern at package/target interface for a particular target.

With reference to FIG. 3A, three-dimensional template generator 330 receives TOF template 310 and image pattern template 325. TOF template 310 defines the proportionality of the expected primary signal contribution and the multipath reflection signal contributions at the plurality of locations and the different times of flight of the ultrasonic sensor. Image pattern template 325 is associated with the target imaged at the ultrasonic sensor, and defines which pixels to disregard in the multipath signal determination, as no signal is expected to be received at these pixels. Three-dimensional template generator 330 combines TOF template 310 and image pattern template 325 to generate a target template 335, wherein the multipath characteristics 215 of the ultrasonic sensor are target template 335.

Figure 9:
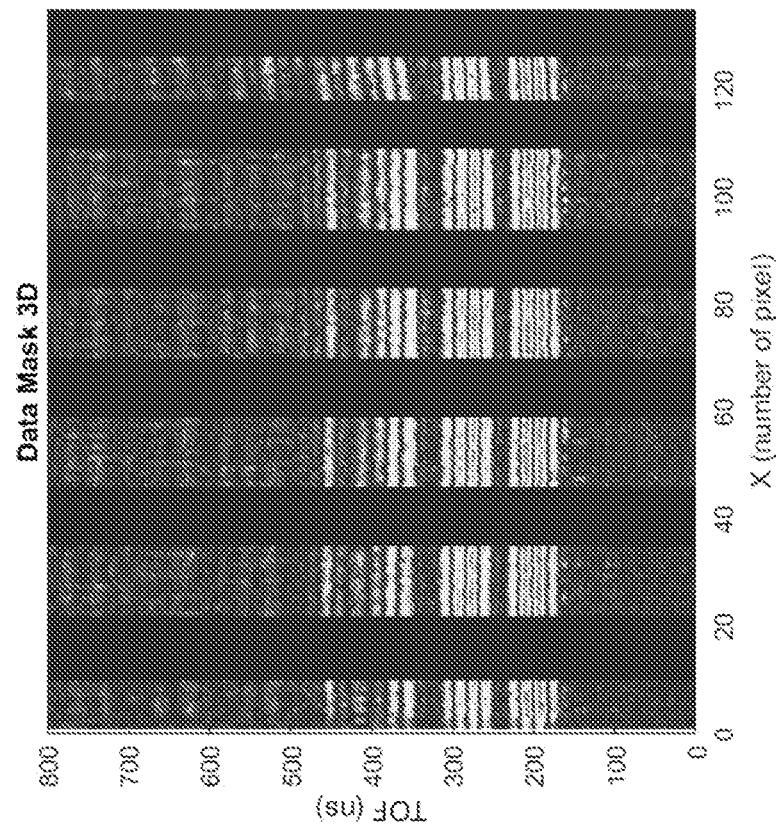
FIG. 9 illustrates an example target template for a target interacting with an ultrasonic sensor, according to embodiments.

FIG. 9 illustrates an example target template 910, also referred to herein as a slice of the 3D template, for a target interacting with an ultrasonic sensor, according to embodiments. For example, based on the amplitude of the first reflection, the image pattern template 710 is formed and applied to the TOF template 810 to form a target template 910. In this example, the image pattern template 710 is applied to the mask in a binary way, depending on the amplitude/energy of, e.g., the first reflection. In some embodiments, the TOF template 710 (or multipath correction model) can be scaled according to the amplitude/energy of the first reflection. Then the 3D measurements will subtract this target template 910 to remove all the multipath signal resulting from the pattern at target/package interface to unveil any shadowed information.

Figure 3B:
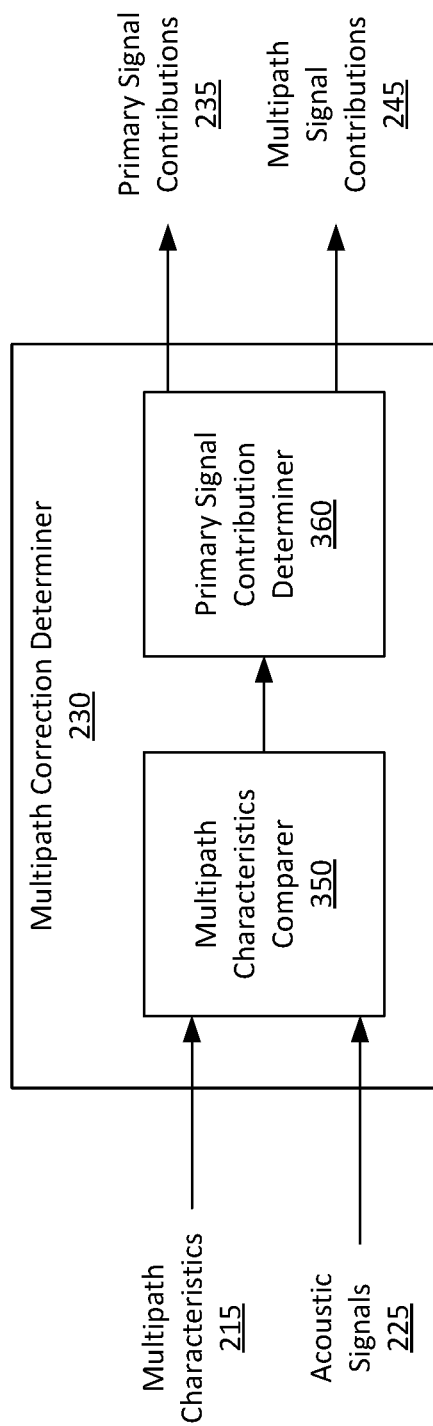
FIG. 3B illustrates a block diagram of an example multipath correction determiner of a multipath correction system, according to some embodiments.

FIG. 3B illustrates a block diagram of example multipath correction determiner 230 of multipath correction system 200, according to some embodiments. Multipath characteristics comparer 350 receives acoustic signals 225 and multipath characteristics 215. In one embodiment, multipath characteristics 215 include a time of flight template 310. In another embodiment, multipath characteristics 215 include a target template 325. Multipath characteristics comparer 350 compares acoustic signals 225 to multipath characteristics 215.

Primary signal contribution determiner 360 receives the comparison of acoustic signals 225 to multipath characteristics 215 from multipath characteristics comparer 350 and determines primary signal contributions 235 of acoustic signals 225. In some embodiments, multipath characteristics comparer 350 also determines multipath signal contributions 245 of acoustic signals 225.

Figure 10:
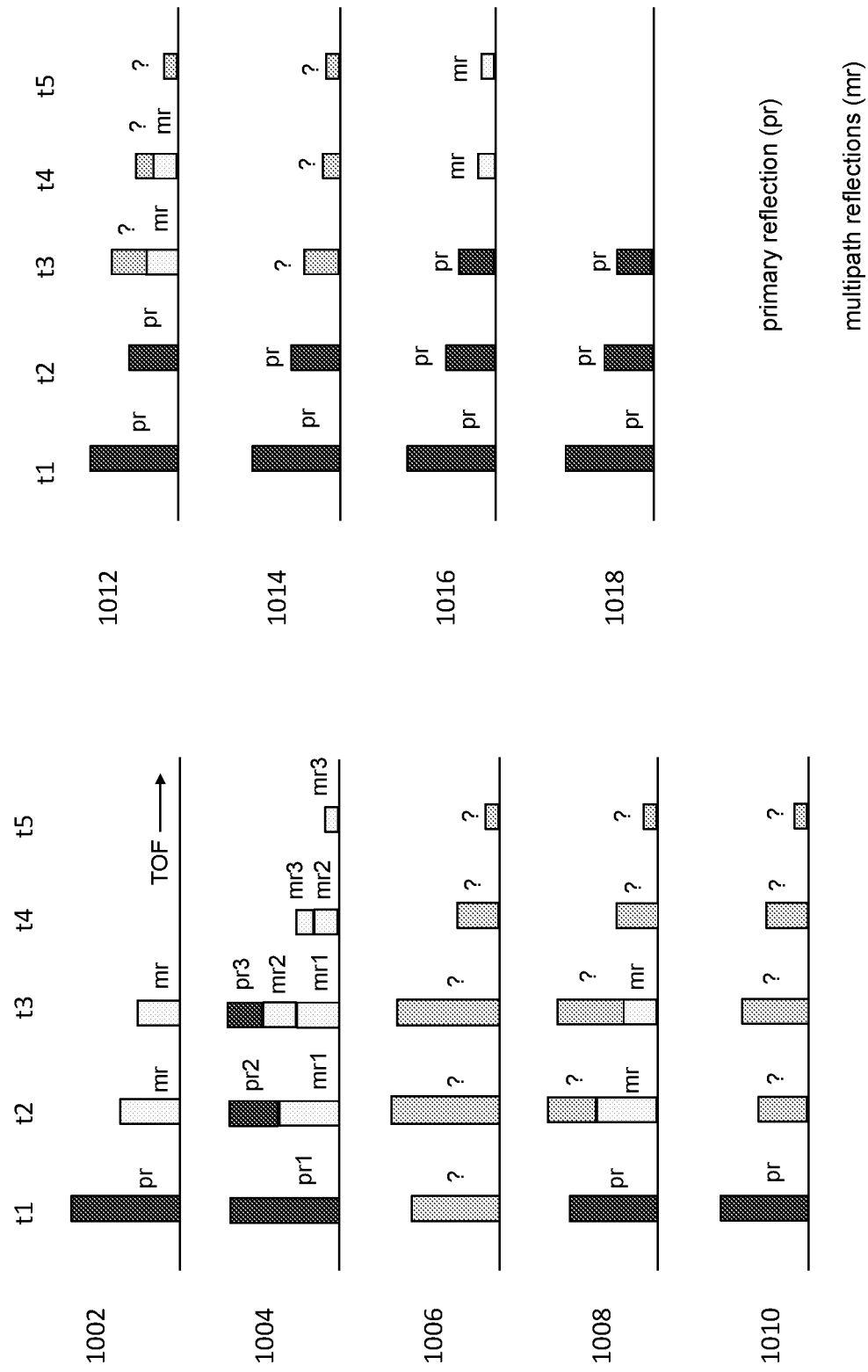
FIG. 10 illustrates a schematic representation of multipath reflection correction using multipath characteristics of an ultrasonic sensor, according to embodiments.

FIG. 10 illustrates a schematic representation of multipath reflection correction using multipath characteristics of an ultrasonic sensor, according to embodiments. The different schematic graphs represent different echoes/reflections as a function of time of flight. Graph 1002 shows a reflection of a single interface/layer with an acoustic impedance mismatch that is predetermined (e.g., at fabrication or calibration) and is representative of the multipath characteristics of the ultrasonic sensor, with the multipath characteristics defining the proportional contributions of the primary signal and the multipath reflection signal at a plurality of locations and different times of flight for the ultrasonic sensor to an acoustic signal. The signal shows a primary (first) reflection (pr) and followed by two later multipath reflections (mr). In a similar manner, graph 1004 shows reflections of a plurality of layers with different depths. The signal shows primary reflection (pr) and followed by two later multipath reflections (mr) for each of the three layers. In this graph the different pr and mr contributions can be easily distinguished.

Graphs 1006 through 1018 illustrate how graph 1002 is applied to measured signals at different times of flight where the different contributions of the multipath reflections are not known (e.g., new received acoustic signals). Graph 1006 illustrates example signal amplitude at different times of flight t1 through t5, where the primary signal and multipath signal contributions are not known. As discussed above, the multipath reflections of the outer layers interfere with the primary reflections of the deeper layer. In one embodiment, the multipath correction can be used in a sequential manner (but other parallel options are also possible). The first step is to compare the first primary reflection with the characteristics of the multipath reflections, as determined in one of the above mentioned calibration methods (e.g., a time of flight template or a target template).

As shown in graph 1008 this allows a determination of the multipath contributions to subsequent peaks. At graph 1008, the first primary signal is determined by determining that the signal at t1 is the primary signal. The proportional signals of graph 1002 (e.g., primary signal at t1 and the successive multipath reflections of t2 and t3) are applied to graph 1008, resulting in the determination of the primary signal at t1 and the multipath contributions at t2 and t3. At graph 1010, the multipath contributions at t2 and t3 are removed, leaving primary signal and multipath signal contributions at t2 through t5. The remaining signal at t2 is assumed to be the second primary reflection.

Next, at graph 1012, the second primary reflection at t2, now corrected for multipath interference, is compared with the characteristics of the multipath reflections of graph 1002. As shown in graph 1012, this allows a determination of the multipath contributions to subsequent signals. Graph 1014 then represent the signal of graph 1012, corrected for the multipath reflections of the second primary reflection using graph 1002. Then, at graph 1016, the third primary reflection at t3, now corrected for multipath interference, is compared with the characteristics of the multipath reflections of graph 1002. As shown in graph 1016, this allows a determination of the multipath contributions to subsequent peaks. Graph 1018 then represents the signals of graph 1016, corrected for the multipath reflections of the third primary reflection. The end result shown in graph 1018 represents the initial signal of graph 1006 corrected for the multipath reflections to reveal only the primary reflections of interest. As mentioned above, this type of correction can be performed until no substantial further signals exist. The primary signal is taken locally, but the multipath correction can be determined globally or locally, as discussed above. Because the primary reflections from the deeper layers may correspond to an increased TOF, the multipath characteristics may be scaled, or otherwise adapted, to adjust for this increase in TOF.

Figure 11:
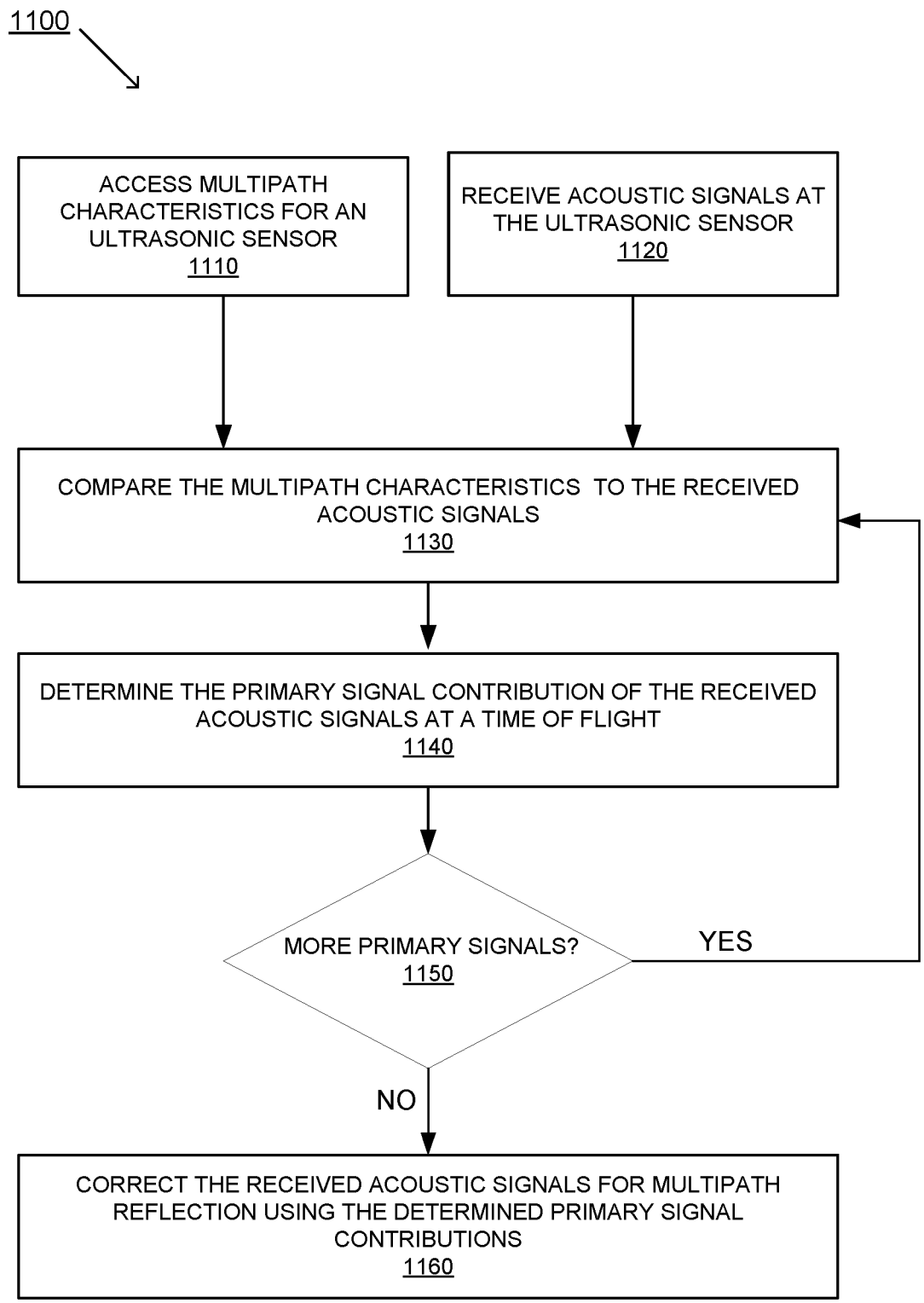
FIG. 11 illustrates an example process for multipath reflection correction of acoustic signals received at an ultrasonic sensor, according to some embodiments.
Figure 12:
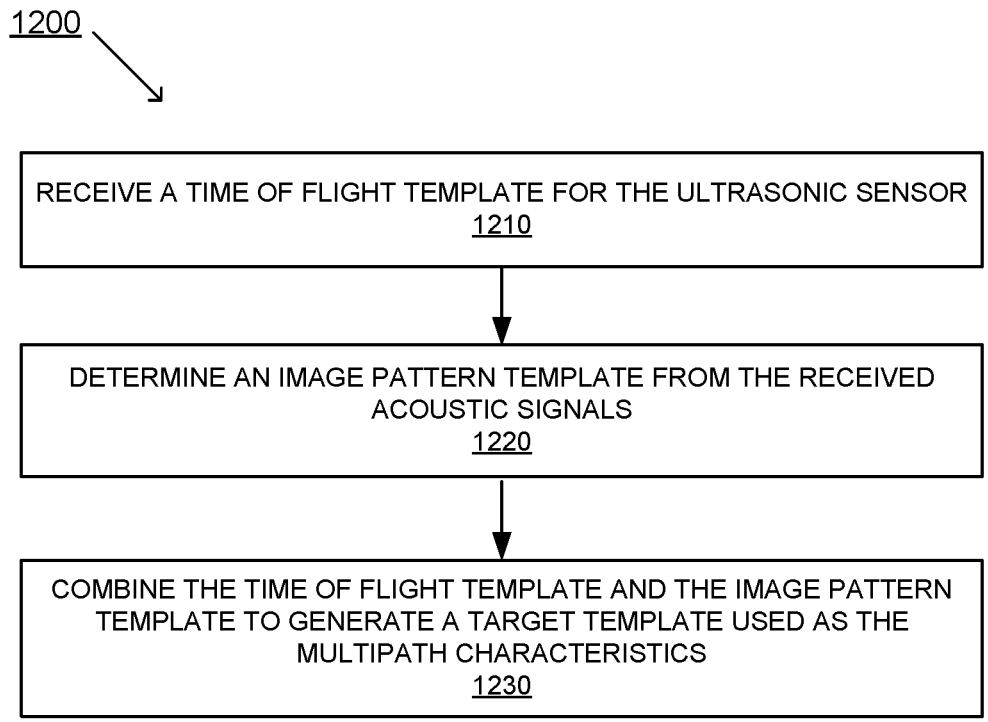
FIG. 12 illustrates an example process for accessing the characteristics of multipath reflection signals of the ultrasonic sensor, according to other embodiments.

Example Operations for Multipath Reflection Correction of Acoustic Signals Received at an Ultrasonic Sensor FIGS. 11 and 12 illustrate example processes for multipath reflection correction of acoustic signals received at an ultrasonic sensor, according to some embodiments. Procedures of the example processes will be described with reference to elements and/or components of various figures described herein. It is appreciated that in some embodiments, the procedures may be performed in a different order than described, that some of the described procedures may not be performed, and/or that one or more additional procedures to those described may be performed. The flow diagram includes some procedures that, in various embodiments, are carried out by one or more processors (e.g., a host processor or a sensor processor) under the control of computer-readable and computer-executable instructions that are stored on non-transitory computer-readable storage media. It is further appreciated that one or more procedures described in the flow diagrams may be implemented in hardware, or a combination of hardware with firmware and/or software.

FIG. 11 illustrates an example flow diagram 1100 for multipath reflection correction of acoustic signals received at an ultrasonic sensor, according to some embodiments. At procedure 1110, characteristics of multipath reflection signals of the ultrasonic sensor are received, wherein the characteristics of the multipath reflection signals of the ultrasonic sensor comprise a relationship of primary signal contributions to multipath reflection signal contributions for acoustic signals received at the ultrasonic sensor at a plurality of times of flight for a plurality of locations of the ultrasonic sensor. In some embodiments, the characteristics of the multipath reflection signals of the ultrasonic sensor are determined without a target interacting with the ultrasonic sensor. In some embodiments, the characteristics of the multipath reflection signals of the ultrasonic sensor comprise a proportionality of the primary signal contribution and the multipath reflection signal contributions at a plurality of locations and different times of flight for the ultrasonic sensor.

In some embodiments, procedure 1110 can be performed according to FIG. 12. FIG. 12 illustrates an example flow diagram 1200 for accessing the characteristics of multipath reflection signals of the ultrasonic sensor, according to other embodiments. At procedure 1210 of flow diagram 1200, a time of flight template defining the proportionality of the primary signal contribution and the multipath reflection signal contributions at the plurality of locations and the different times of flight of the ultrasonic sensor during calibration is received, wherein the characteristics of multipath reflection signals of the ultrasonic sensor comprise the time of flight template. In some embodiments, as shown at procedure 1220, an image pattern template associated with a target interacting with the ultrasonic sensor is determined from the received acoustic signals. At procedure 1230, the time of flight template and the image pattern template are combined to generate a target template, wherein the characteristics of multipath reflection signals of the ultrasonic sensor comprise the target template.

With reference to flow diagram 1100 of FIG. 11, at procedure 1120, acoustic signals are received at the ultrasonic sensor over a time of flight range while a target is interacting with the ultrasonic sensor, wherein the acoustic signals comprise a primary signal contribution and a multipath reflection signal contribution. It should be appreciated that procedures 1110 and 1120 can be performed in any order, and can be performed sequentially, concurrently, or in parallel.

At procedure 1130, the characteristics of the multipath reflection signals of the ultrasonic sensor are compared to received acoustic signals. At procedure 1140, the primary signal contribution of the received acoustic signals is determined at a plurality of times of flight of the time of flight range based on the characteristics of the multipath reflection signals of the ultrasonic sensor. In some embodiments, an acoustic signal is identified as a first primary signal of the target. In some embodiments, comparing the characteristics of the multipath reflection signals of the ultrasonic sensor to the received acoustic signals includes comparing the characteristics of the multipath reflection signals of the ultrasonic sensor to the first primary signal.

At procedure 1150, it is determined whether there are more primary signals to identify. Provided there are not more primary signals to identify, flow diagram 1100 proceeds to procedure 1160. At procedure 1160, the received acoustic signals are corrected for multipath reflection using the determined primary signal contributions. Provided there are more primary signals to identify, flow diagram 1100 returns to procedure 1130 using the next primary signal. In some embodiments, a second primary signal is identified based on the comparing the characteristics of the multipath reflection signals of the ultrasonic sensor to the first primary signal, wherein the second primary signal has a later time of flight than the first primary signal. In some embodiments, the second primary signal is received from a deeper layer within the target than the first primary signal. In some embodiments, the characteristics of the multipath reflection signals of the ultrasonic sensor are compared to the second primary signal. In some embodiments, a third primary signal is identified based on the comparing the characteristics of the multipath reflection signals of the ultrasonic sensor to the second primary signal, wherein the third primary signal has a later time of flight than the second primary signal.

Conclusion

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method for multipath reflection correction of acoustic signals received at an ultra sonic sensor, the method comprising:
   accessing characteristics of multipath reflection signals of the ultrasonic sensor stored in memory associated with the ultrasonic sensor, wherein the characteristics of the multipath reflection signals of the ultrasonic sensor comprise a proportional relationship of primary signal contributions to multipath reflection signal contributions for acoustic signals received at the ultrasonic sensor at a plurality of times of flight for a plurality of locations of the ultrasonic sensor;
   receiving acoustic signals at the ultrasonic sensor over a time of flight range while a target is interacting with the ultrasonic sensor, wherein the acoustic signals comprise a primary signal contribution and a multipath reflection signal contribution;
   comparing the characteristics of the multipath reflection signals of the ultrasonic sensor to the received acoustic signals; and
   determining the primary signal contribution of the received acoustic signals at a plurality of times of flight of the time of flight range based on the characteristics of the multipath reflection signals of the ultrasonic sensor, wherein the primary signal contribution includes the received acoustic signals accounting for the multipath reflection signals.

2. The method of claim 1, wherein the characteristics of the multipath reflection signals of the ultrasonic sensor are determined without a target interacting with the ultrasonic sensor.

3. The method of claim 1, wherein the characteristics of the multipath reflection signals of the ultrasonic sensor comprise a proportionality of the primary signal contribution and the multipath reflection signal contributions at a plurality of locations and different times of flight for the ultrasonic sensor.

4. The method of claim 3, wherein the accessing the characteristics of multipath reflection signals of the ultrasonic sensor comprises:
   receiving a time of flight template defining the proportionality of the primary signal contribution and the multipath reflection signal contributions at the plurality of locations and the different times of flight of the ultrasonic sensor during calibration, wherein the characteristics of multipath reflection signals of the ultrasonic sensor comprise the time of flight template.

5. The method of claim 4, wherein the accessing the characteristics of multipath reflection signals of the ultrasonic sensor further comprises:
determining an image pattern template associated with a target interacting with the ultrasonic sensor from the received acoustic signals; and
combining the time of flight template and the image pattern template to generate a target template, wherein the characteristics of multipath reflection signals of the ultrasonic sensor comprise the target template.

6. The method of claim 1, further comprising:
identifying an acoustic signal as a first primary signal of the target.

7. The method of claim 6, wherein the comparing the characteristics of the multipath reflection signals of the ultrasonic sensor to the received acoustic signals comprises:
comparing the characteristics of the multipath reflection signals of the ultrasonic sensor to the first primary signal.

8. The method of claim 7, wherein the determining the primary signal contribution of the received acoustic signals at the plurality of times of flight of the time of flight range based on the characteristics of the multipath reflection signals of the ultrasonic sensor comprises:
identifying a second primary signal based on the comparing the characteristics of the multipath reflection signals of the ultrasonic sensor to the first primary signal, wherein the second primary signal has a later time of flight than the first primary signal.

9. The method of claim 8, wherein the second primary signal is received from a deeper layer within the target than the first primary signal.

10. The method of claim 8, wherein the comparing the characteristics of the multipath reflection signals of the ultrasonic sensor to the received acoustic signals further comprises:
comparing the characteristics of the multipath reflection signals of the ultrasonic sensor to the second primary signal.

11. The method of claim 10, wherein the determining the primary signal contribution of the received acoustic signals at the plurality of times of flight of the time of flight range based on the characteristics of the multipath reflection signals of the ultrasonic sensor comprises:
identifying a third primary signal based on the comparing the characteristics of the multipath reflection signals of the ultrasonic sensor to the second primary signal, wherein the third primary signal has a later time of flight than the second primary signal.

12. The method of claim 1, further comprising:
correcting the received acoustic signals for multipath reflection using determined primary signal contributions of the received acoustic signals.

13. An ultrasonic sensor device comprising:
a plurality of ultrasonic transducers;
a memory device; and
a processor, wherein the processor is configured to:
access characteristics of multipath reflection signals of the ultrasonic sensor device stored in the memory device, wherein the characteristics of the multipath reflection signals of the ultrasonic sensor device comprise a proportional relationship of primary signal contributions to multipath reflection signal contributions for acoustic signals received at the ultrasonic sensor device at a plurality of times of flight for a plurality of locations of the ultrasonic sensor device;
receive acoustic signals a t the ultrasonic sensor device over a time of flight range while a target is interacting with the ultrasonic sensor device, wherein the acoustic signals comprise a primary signal contribution and a multipath reflection signal contribution;
compare the characteristics of the multipath reflection signals of the ultrasonic sensor device to the received acoustic signals; and
determine the primary signal contribution of the received acoustic signals at a plurality of times of flight of the time of flight range based on the characteristics of the multipath reflection signals of the ultra sonic sensor device, wherein the primary signal contribution comprises the received acoustic signals accounting for the multipath reflection signal contribution.

14. The ultrasonic sensor device of claim 13, wherein the characteristics of the multipath reflection signals of the ultrasonic sensor comprise a proportionality of the primary signal contribution and the multipath reflection signal contributions at a plurality of locations and different times of flight for the ultrasonic sensor.

15. The ultrasonic sensor device of claim 14, where the processor is further configured to:
receive a time of flight template defining the proportionality of the primary signal contribution and the multipath reflection signal contributions at the plurality of locations and the different times of flight of the ultrasonic sensor during calibration, wherein the characteristics of multipath reflection signals of the ultrasonic sensor comprise the time of flight template.

16. The ultrasonic sensor device of claim 15, where the processor is further configured to:
determine an image pattern template associated with a target interacting with the ultrasonic sensor from the received acoustic signals; and
combine the time of flight template and the image pattern template to generate a target template, wherein the characteristics of multipath reflection signals of the ultrasonic sensor comprise the target template.

17. The ultrasonic sensor device of claim 13, where the processor is further configured to:
identify an acoustic signal as a first primary signal of the target;
compare the characteristics of the multipath reflection signals of the ultrasonic sensor to the first primary signal; and
identify a second primary signal based on the comparing the characteristics of the multipath reflection signals of the ultrasonic sensor to the first primary signal, wherein the second primary signal has a later time of flight than the first primary signal.

18. A non-transitory computer readable storage medium having computer readable program code stored thereon for causing a computer system to perform a method for multipath reflection correction of acoustic signals received at an ultrasonic sensor, the method comprising:
accessing characteristics of multipath reflection signals of the ultrasonic sensor stored in memory associated with the ultrasonic sensor, wherein the characteristics of the multipath reflection signals of the ultrasonic sensor comprise a proportional relationship of primary signal contributions to multipath reflection signal contributions for acoustic signals received at the ultrasonic sensor ata plurality of times of flight for a plurality of locations of the ultrasonic sensor;

receiving acoustic signals at the ultrasonic sensor over a time of flight range while a target is interacting with the ultrasonic sensor, wherein the acoustic signals comprise a primary signal contribution and a multipath reflection signal contribution;

comparing the characteristics of the multipath reflection signals of the ultrasonic sensor to the received acoustic signals; and determining the primary signal contribution of the received acoustic signals at a plurality of times of flight of the time of flight range based on the characteristics of the multipath reflection signals of the ultrasonic sensor, wherein the primary signal contribution comprises the received acoustics signals acoustic for the multipath reflection signal contribution.

19. The non-transitory computer readable storage medium of claim 18, wherein the characteristics of the multipath reflection signals of the ultrasonic sensor comprise a proportionality of the primary signal contribution and the multipath reflection signal contributions at a plurality of locations and different times of flight for the ultrasonic sensor.

20. The non-transitory computer readable storage medium of claim 19, wherein the accessing the characteristics of multipath reflection signals of the ultrasonic sensor comprises:

receiving a time of flight template defining the proportionality of the primary signal contribution and the multipath reflection signal contributions at the plurality of locations and the different times of flight of the ultrasonic sensor during calibration, wherein the characteristics of multipath reflection signals of the ultrasonic sensor comprise the time of flight template.

* * * * *